US012574205B2

(12) United States Patent
Tueno et al.

(10) Patent No.: US 12,574,205 B2
(45) Date of Patent: Mar. 10, 2026

(54) TWO-PARTY PRIVACY PRESERVING DECISION TREE EVALUATION USING ADDITIVELY HOMOMORPHIC ENCRYPTION

(71) Applicant: SAP SE, Walldorf (DE)

(72) Inventors: Anselme Tueno, Ettlingen (DE); David Boehm, Landau in der Pflaz (DE)

(73) Assignee: SAP SE, Walldorf (DE)

( * ) Notice: Subject to any disclaimer, the term of this patent is extended or adjusted under 35 U.S.C. 154(b) by 112 days.

(21) Appl. No.: 18/421,708

(22) Filed: Jan. 24, 2024

(65) Prior Publication Data

US 2025/0158800 A1 May 15, 2025

Related U.S. Application Data

(60) Provisional application No. 63/548,289, filed on Nov. 13, 2023.

(51) Int. Cl.
H04L 9/00 (2022.01)
G06F 21/62 (2013.01)
H04L 9/14 (2006.01)

(52) U.S. Cl.
CPC .......... H04L 9/008 (2013.01); G06F 21/6245 (2013.01); H04L 9/14 (2013.01)

(58) Field of Classification Search
CPC ....... H04L 9/008; H04L 9/14; H04L 2209/46; G06F 21/6245; G06F 18/24323; G06N 5/01; G06N 20/00; H04W 12/065
See application file for complete search history.

(56) References Cited

U.S. PATENT DOCUMENTS

| 9,787,647 B2 * | 10/2017 | Wu ........................... G06N 5/02 |
| 11,599,681 B2 * | 3/2023 | Araki ....................... G06F 7/727 |

(Continued)

FOREIGN PATENT DOCUMENTS

| CN | 111967514 A | * | 11/2020 | ....... G06F 18/24323 |
| CN | 115168841 A | * | 10/2022 | ............. G06F 21/55 |

(Continued)

OTHER PUBLICATIONS

Ahmed, A.A.E. and Traore, I., "A New Biometric Technology Based on Mouse Dynamics," IEEE Trans. On Dependable and Secure Computing, vol. 4, No. 3, Jul.-Sep. 2007, pp. 165-179.

(Continued)

*Primary Examiner* — John B King
(74) *Attorney, Agent, or Firm* — Sterne, Kessler, Goldstein & Fox P.L.L.C.

(57) ABSTRACT

Disclosed herein are system, method, and computer program product embodiments for evaluating a decision tree in a privacy preserving manner. In embodiments, s first server receives a first partial share of the decision tree and encrypted input data from a client, wherein the input data comprises a set of attributes. A second server receives a second partial share of the decision tree. Each of the first server and the second server communicate with the other server to compute a classification result over the encrypted input data using the respective partial share of the decision tree received thereby and secure multi-party computation methods, including additive homomorphic encryption and oblivious transfer, such that the classification result is computed without decrypting the encrypted input data, and such that the classification result is ultimately received by the first server. The first server then transmits the classification result to the client.

20 Claims, 14 Drawing Sheets

1400

(56) References Cited

U.S. PATENT DOCUMENTS

| | | | | | |
|---|---|---|---|---|---|
| 2016/0156595 | A1* | 6/2016 | Wu | | H04L 9/008 |
| | | | | | 713/168 |
| 2018/0139054 | A1* | 5/2018 | Chu | | H04L 9/008 |
| 2021/0376995 | A1* | 12/2021 | Ratha | | H04L 9/0618 |
| 2022/0101160 | A1* | 3/2022 | Chen | | G06N 20/00 |
| 2023/0084325 | A1* | 3/2023 | Zhang | | G06N 5/01 |
| | | | | | 706/12 |

FOREIGN PATENT DOCUMENTS

| | | | | | | |
|---|---|---|---|---|---|---|
| CN | 117010018 | A | * | 11/2023 | ......... | G06F 21/6245 |
| CN | 117370803 | A | * | 1/2024 | ......... | G06F 18/2155 |
| CN | 114048804 | B | * | 4/2024 | ............ | G06N 20/20 |
| CN | 118869275 | A | * | 10/2024 | ......... | G06F 21/6245 |
| JP | 7064682 | B2 | * | 5/2022 | ............ | G06F 18/24 |

OTHER PUBLICATIONS

Almalki, S. et al., "Continuous Authentication Using Mouse Clickstream Data Analysis," Security, Privacy, and Anonymity in Computation, Communication, and Storage, SpaCCS 2019 International Workshops Proceedings, Jul. 14-17, 2019, pp. 76-85.
Antai, M. and Egyed-Zsigmond, E., "Intrusion detection using mouse dynamics," IET Biometrics, vol. 8, Issue 5, 2019, pp. 284-294.
Bettaieb, S. et al., "Secure Decision Forest Evaluation," arXiv:2108.08546v1 [cs.CR], Aug. 19, 2021, pp. 1-25.
"Binary tree," Wikipedia, available at https://en.wikipedia.org/w/index.php?title=Binary_tree&oldid=1172664800, Aug. 28, 2023, 13 pages.
Black, P.E., "full binary tree," available at https://xlinux.nist.gov/dads/HTML/fullBinaryTree.html, Aug. 27, 2014, 1 page.
Damgård, I. et al., "Homomorphic encryption and secure comparison," Int. J. Applied Cryptography, vol. 1, No. 1, 2008, pp. 22-31.
De Ru, W.G. and Eloff, J.H.P., "Reinforcing password authentication with typing biometrics," Information Security—the Next Decade, IFIP, 1995, pp. 562-574.
Elgamal, T., "A Public Key Cryptosystem and a Signature Scheme Based on Discrete Logarithms," IEEE Trans. On Information Theory, vol. IT-31, No. 4, Jul. 1985, 4 pages.
Evans, D. et al., "A Pragmatic Introduction to Secure Multi-Party Computation," Apr. 15, 2020, pp. 1-180.
Fredrikson, M. et al., "Model Inversion Attacks that Exploit Confidence Information and Basic Countermeasures," CCS'15, Oct. 12-16, 2015, 12 pages.
Fülöp, Á. et al., "Balabit Mouse Challenge Data Set," available at https://github.com/balabit/Mouse-Dynamics-Challenge, 2016, 4 pages.
Fülöp, Á., "Releasing the Balabit Mouse Dynamics Challenge Data Set," available at https://medium.com/balabit-unsupervised/releasing-the-balabit-mouse-dynamics-challenge-data-set-a15a016fba6c, Aug. 26, 2016, 7 pages.
Ishai, Y. et al., "Extending Oblivious Transfers Efficiently," available at https://www.iacr.org/archive/crypto2003/27290145/27290145.pdf, Lecture Notes in Computer Science, Jun. 2003, 17 pages.
Joye, M. and Salehi, F., "Private yet Efficient Decision Tree Evaluation," 32th IFIP Annual Conference on Data and Applications Security and Privacy (DBSec), Jul. 2018, pp. 243-259.

Kiss, Á. et al., "SoK: Modular and Efficient Private Decision Tree Evaluation," Proceedings on Privacy Enhancing Technologies, Apr. 2019, pp. 187-208.
Koblitz, N., "Elliptic Curve Cryptosystems," Mathematics of Computation, vol. 48, No. 177, Jan. 1987, pp. 203-209.
Koblitz, N. et al., "The State of Elliptic Curve Cryptography," Designs, Codes and Cryptography, vol. 19, 2000, pp. 173-193.
Kolesnikov. V. et al., "Efficient Batched Oblivious PRF with Applications to Private Set Intersection," CCS,16, Oct. 24-28, 2016, pp. 818-829.
Ma, J.P.K. et al., "Let's Stride Blindfolded in a Forest: Sublinear Multi-Client Decision Trees Evaluation," Network and Distributed Systems Security (NDSS) Symposium, Feb. 21-25, 2021, pp. 1-18.
Mahfouz, A. et al., "A Survey on Behavioral Biometric Authentication on Smartphones," Journal of Information Security and Applications, Dec. 2017, pp. 1-16.
Monschein, D. and Waldhorst, O.P., "mPSAuth: Privacy-Preserving and Scalable Authentication for Mobile Web Applications," arXiv:2210.04777v1 [cs.CR], Oct. 7, 2022, 13 pages.
Paillier, P., "Public-Key Cryptosystems Based on Composite Degree Residuosity Classes," EUROPCRYT'99, LNCS 1592, 1999, pp. 223-238.
Patel, V.M. et al., "Continuous User Authentication on Mobile Devices," IEEE Signal Processing Magazine, Jul. 2016, pp. 49-61.
Siddiqui, N. et al., "Machine and Deep Learning Applications to Mouse Dynamics for Continuous User Authentication," Mach. Learn. Knowl. Extr., vol. 4, 2022, pp. 502-518.
Spector, B., "What is Multi-Party Computation (MPC)?," available at https://www.qredo.com/blog/what-is-multi-party-computation-mpc, Jul. 2, 2021, 13 pages.
Tai, R.K.H. et al., "Privacy-Preserving Decision Trees Evaluation via Linear Functions," ESORICS 2017, Part II, LNCS 10493, 2017, pp. 494-512.
Tramèr, F. et al., "Stealing Machine Learning Models via Prediction APIs," Proceedings of the 25th USENIX Security Symposium, Aug. 10-12, 2016, pp. 601-618.
Tueno, A. and Janneck, J., "A Method for Securely Comparing Integers using Binary Trees," available at https://eprint.iacr.org/2021/1646.pdf, Dec. 16, 2021, 33 pages.
Tueno, A. et al., "Non-interactive Private Decision Tree Evaluation," 34th IFIP Annual Conference on Data and Applications Security and Privacy (DBSec), Jun. 2020, pp. 174-194.
Tueno, A. et al., "Private Evaluation of Decision Trees using Sublinear Cost," Proc. on Privacy Enhancing Technologies, vol. 1, 2019, pp. 266-286.
"What is a Decision Tree?" available at https://www.ibm.com/topics/decision-trees, printed Jan. 2, 2024, 14 pages.
Wu, X. et al., "A Methodology for Formalizing Model-Inversion Attacks," IEEE 29th Computer Security Foundations Symposium, 2016, pp. 355-370.
Zheng, Y. et al., "Optimizing Secure Decision Tree Inference Outsourcing," IEEE Transactions on Dependable and Secure Computing, vol. 20, No. 4, Jul./Aug. 2023, pp. 3079-3092.
Zheng, Y. et al., "Securely and Efficiently Outsourcing Decision Tree Inference," IEEE Transactions on Dependable and Secure Computing, vol. 19, No. 3, May/Jun. 2022, pp. 1841-1855.
Zhong, Y. et al., "Keystroke Dynamics for User Authentication," IEEE, available at https://eprint.iacr.org/2021/1646.pdf, 2012, pp. 117-123.

* cited by examiner

200

300

1200

| Phase | Client | | Server 1 | | Server 2 |
|---|---|---|---|---|---|
| *Input* | $x$ $(pk_1, pk_2)$ | $[\![x]\!]_{pk_2}$ | $[\![T]\!]_{pk_2}$, $(pk_1, sk_1)$ | | $[\![C]\!]_{pk_1}$, $(pk_2, sk_2)$ |
| *Comparison Computation* | | | $B^{(1)}, [\![B^{(2)}]\!]_{pk_2} \leftarrow$ FULLCOMP$\left([\![x]\!]_{pk_2}, [\![T]\!]_{pk_2}\right)$ | $[\![B^{(1)}]\!]_{pk_1}, [\![B^{(2)}]\!]_{pk_2}$ | $[\![B]\!]_{pk_1} \leftarrow$ EVALCOMP$\left([\![B^{(1)}]\!]_{pk_1}, B^{(2)}\right)$ |
| *Edge Labeling* | | | | | $G' \leftarrow$ LABEDGES$\left(\mathcal{T}, [\![B]\!]_{pk_1}\right)$ |
| *Tree Evaluation* | | | | $P'$ | $P', \pi \leftarrow$ AGGRPATHS$(G')$ |
| *Classification Determination* | $c_{\pi(i)} \in \{0, 1\}$ | $c_{\pi(i)}$ | DEC$(P', sk_1)$ $\quad$ DEC$([\![c_{\pi(i)}]\!]_{pk_1}, sk_1)$ | $\boxed{OT_1^{m+1}}$ $[\![c_{\pi(i)}]\!]_{pk_1}$ $\pi(i)$ | $[\![\pi(c)]\!]_{pk_1}$ |

FIG. 12

1300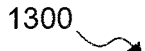

Provide Server 1 with: (a) a first public-private key pair, consisting of a first public key and a first private key; (b) a second public key, the second public key comprising part of a second public-private key pair provided to Server 2; and (c) a first partial share of a decision tree classifier, the first portion of the decision tree classifier consisting of: (i) a tuple of thresholds respectively associated with the decision tree nodes of the decision tree classifier, wherein each threshold in the tuple of thresholds is encrypted bitwise (using an AHE scheme) using the second public key; and (ii) a tuple of attribute indices respectively associated with the decision tree nodes of the decision tree classifier, each attribute index in the tuple of attribute indices indicating an input data attribute associated with a corresponding decision tree node     1302

Provide Server 2 with: (a) the second public-private key pair, consisting of the second public key and a second private key; (b) the first public key; and (c) a second portion of the decision tree classifier, the second portion of the decision tree classifier consisting of: (i) a description of the tree structure of the decision tree classifier; and (ii) a tuple of classification labels respectively associated with the leaf nodes of the decision tree classifier, wherein each classification label is encrypted (using the AHE scheme) using the first public key     1304

Provide Client with the first public key and the second public key     1306

Client obtains input data comprising a set of attributes and encrypts bitwise (using an AHE scheme) each attribute of the input data using the second public key, thereby generating encrypted input data     1308

Client transmits the encrypted input data to Server 1     1310

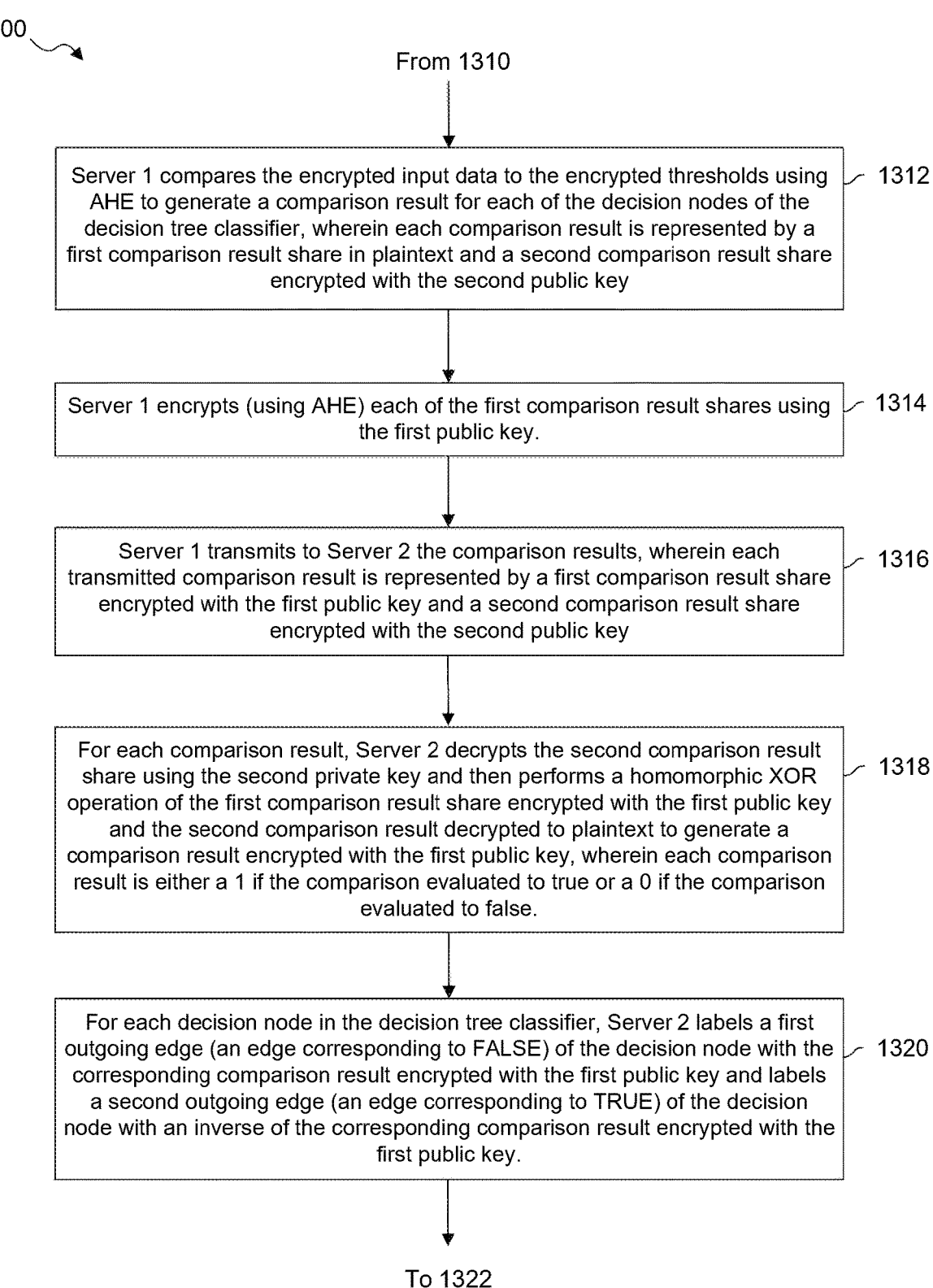

From 1310

Server 1 compares the encrypted input data to the encrypted thresholds using AHE to generate a comparison result for each of the decision nodes of the decision tree classifier, wherein each comparison result is represented by a first comparison result share in plaintext and a second comparison result share encrypted with the second public key    1312

Server 1 encrypts (using AHE) each of the first comparison result shares using the first public key.    1314

Server 1 transmits to Server 2 the comparison results, wherein each transmitted comparison result is represented by a first comparison result share encrypted with the first public key and a second comparison result share encrypted with the second public key    1316

For each comparison result, Server 2 decrypts the second comparison result share using the second private key and then performs a homomorphic XOR operation of the first comparison result share encrypted with the first public key and the second comparison result decrypted to plaintext to generate a comparison result encrypted with the first public key, wherein each comparison result is either a 1 if the comparison evaluated to true or a 0 if the comparison evaluated to false.    1318

For each decision node in the decision tree classifier, Server 2 labels a first outgoing edge (an edge corresponding to FALSE) of the decision node with the corresponding comparison result encrypted with the first public key and labels a second outgoing edge (an edge corresponding to TRUE) of the decision node with an inverse of the corresponding comparison result encrypted with the first public key.    1320

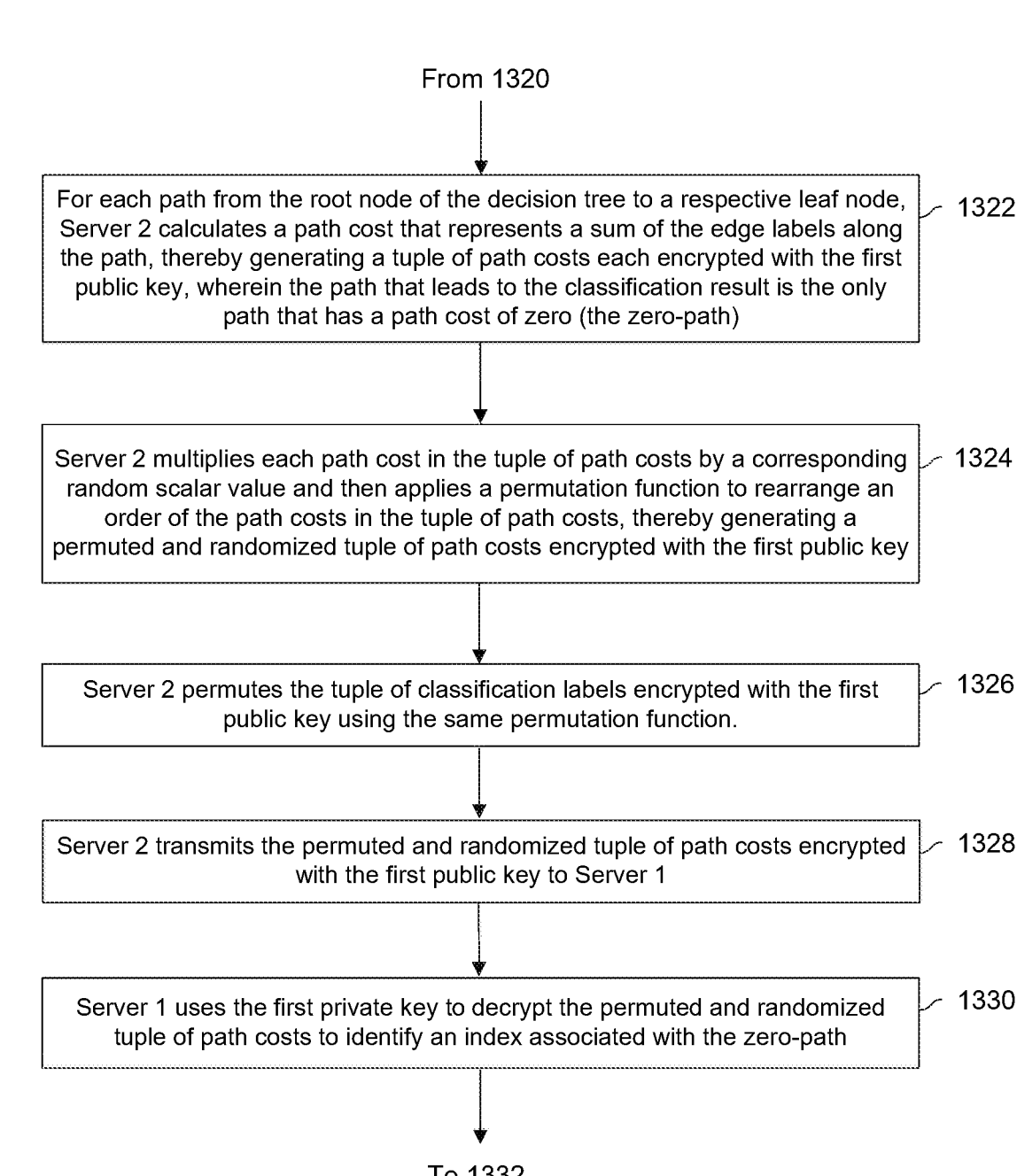

From 1320

For each path from the root node of the decision tree to a respective leaf node, Server 2 calculates a path cost that represents a sum of the edge labels along the path, thereby generating a tuple of path costs each encrypted with the first public key, wherein the path that leads to the classification result is the only path that has a path cost of zero (the zero-path)   1322

Server 2 multiplies each path cost in the tuple of path costs by a corresponding random scalar value and then applies a permutation function to rearrange an order of the path costs in the tuple of path costs, thereby generating a permuted and randomized tuple of path costs encrypted with the first public key   1324

Server 2 permutes the tuple of classification labels encrypted with the first public key using the same permutation function.   1326

Server 2 transmits the permuted and randomized tuple of path costs encrypted with the first public key to Server 1   1328

Server 1 uses the first private key to decrypt the permuted and randomized tuple of path costs to identify an index associated with the zero-path   1330

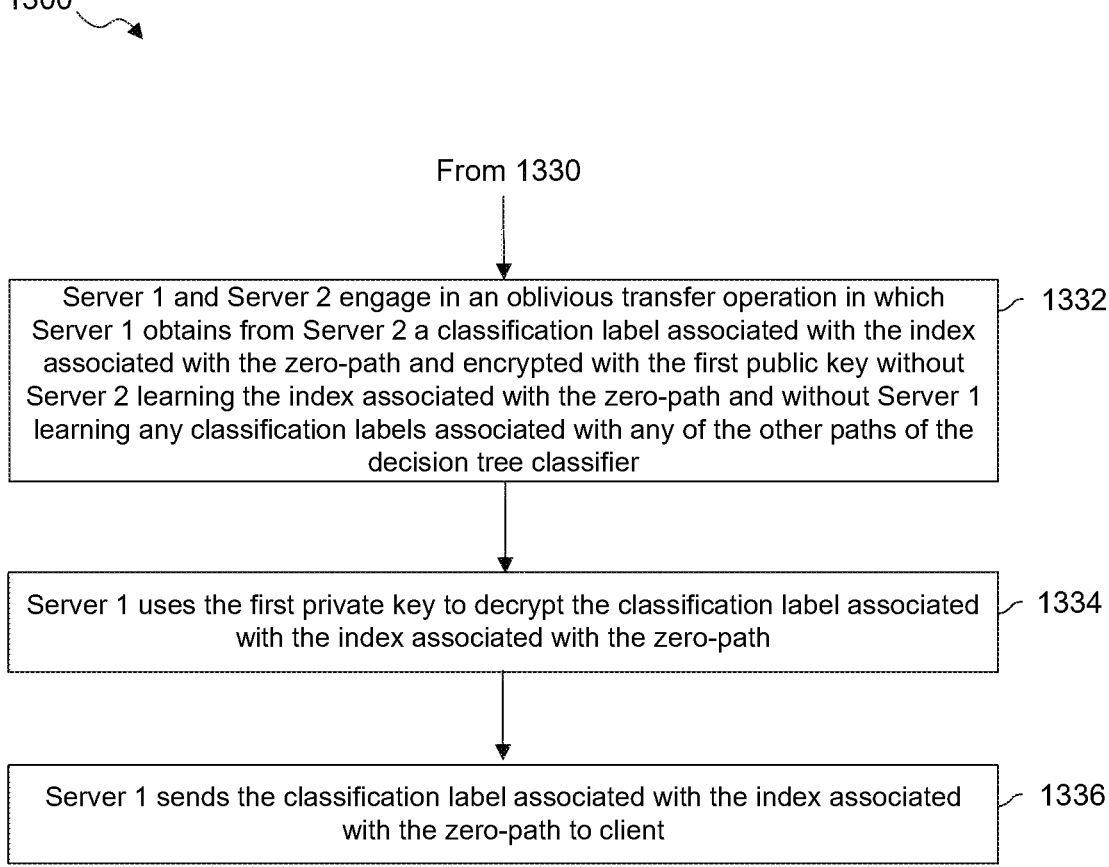

From 1330

Server 1 and Server 2 engage in an oblivious transfer operation in which Server 1 obtains from Server 2 a classification label associated with the index associated with the zero-path and encrypted with the first public key without Server 2 learning the index associated with the zero-path and without Server 1 learning any classification labels associated with any of the other paths of the decision tree classifier — 1332

Server 1 uses the first private key to decrypt the classification label associated with the index associated with the zero-path — 1334

Server 1 sends the classification label associated with the index associated with the zero-path to client — 1336

FIG. 13D

1400

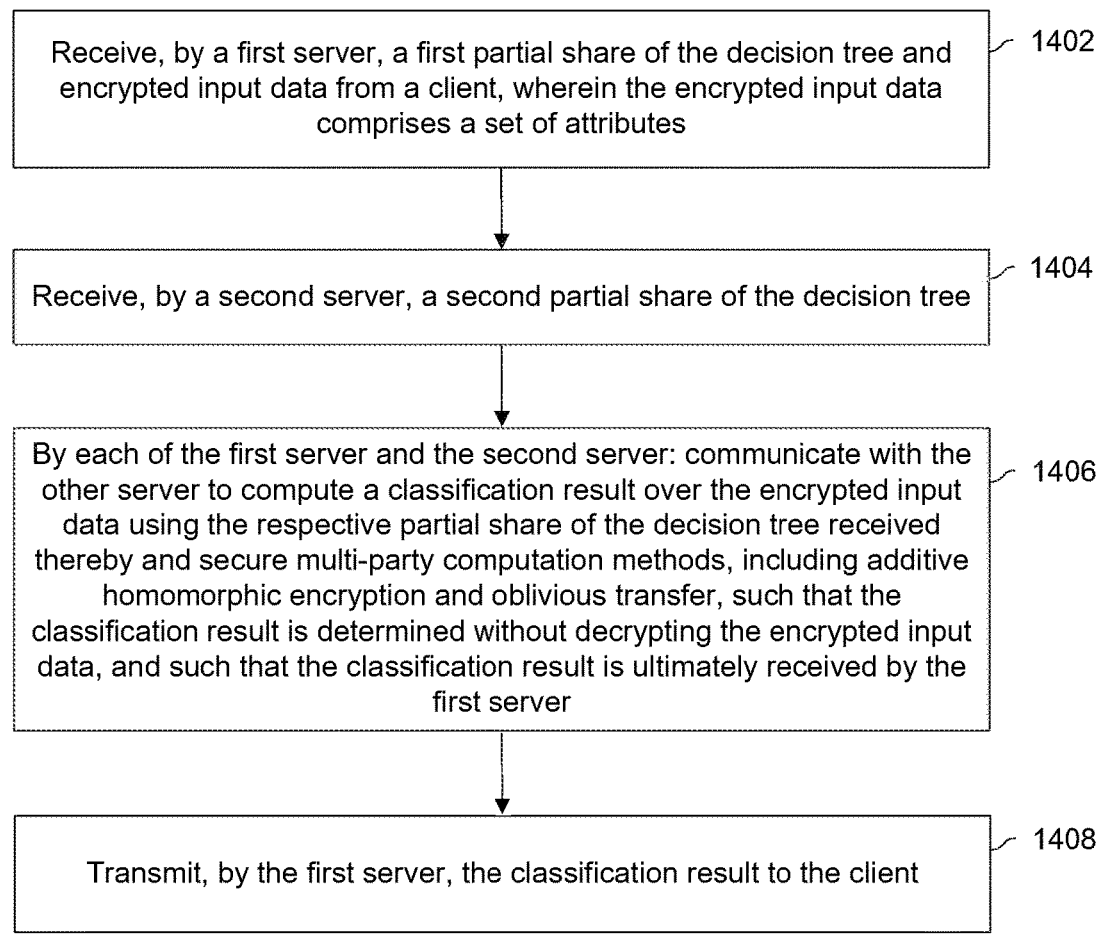

Receive, by a first server, a first partial share of the decision tree and encrypted input data from a client, wherein the encrypted input data comprises a set of attributes ⎯ 1402

Receive, by a second server, a second partial share of the decision tree ⎯ 1404

By each of the first server and the second server: communicate with the other server to compute a classification result over the encrypted input data using the respective partial share of the decision tree received thereby and secure multi-party computation methods, including additive homomorphic encryption and oblivious transfer, such that the classification result is determined without decrypting the encrypted input data, and such that the classification result is ultimately received by the first server ⎯ 1406

Transmit, by the first server, the classification result to the client ⎯ 1408

FIG. 14

TWO-PARTY PRIVACY PRESERVING DECISION TREE EVALUATION USING ADDITIVELY HOMOMORPHIC ENCRYPTION

CROSS-REFERENCE TO RELATED APPLICATION

This application claims priority to U.S. provisional patent application No. 63/548,289, filed Nov. 13, 2023, which is herein incorporated by reference in its entirety.

BACKGROUND

The increasing complexity of security measures due to the emergence of different types of attacks demands multiple security techniques to effectively safeguard data and applications. One such technique is continuous authentication, which verifies a user's identity throughout the interaction with a system by continuously monitoring and evaluating behavioral and biometric user data. However, creating a classifier for continuous authentication requires a large amount of user data, which in most cases is highly sensitive, causing its disclosure to violate privacy and security.

BRIEF DESCRIPTION OF THE DRAWINGS

The accompanying drawings are incorporated herein and form a part of the specification.

FIG. 12 illustrates a concise overview of an example protocol for performing privacy preserving decision tree evaluation, according to some embodiments.

FIGS. 13A, 13B, 13C and 13D collectively depict a flowchart of an example method for performing privacy preserving decision tree evaluation, according to some embodiments.

FIG. 14 depicts a flowchart of an example method for performing privacy preserving decision tree evaluation, according to some embodiments.

In the drawings, like reference numbers generally indicate identical or similar elements. Additionally, generally, the left-most digit(s) of a reference number identifies the drawing in which the reference number first appears.

DETAILED DESCRIPTION

1. Introduction

Figure 1:
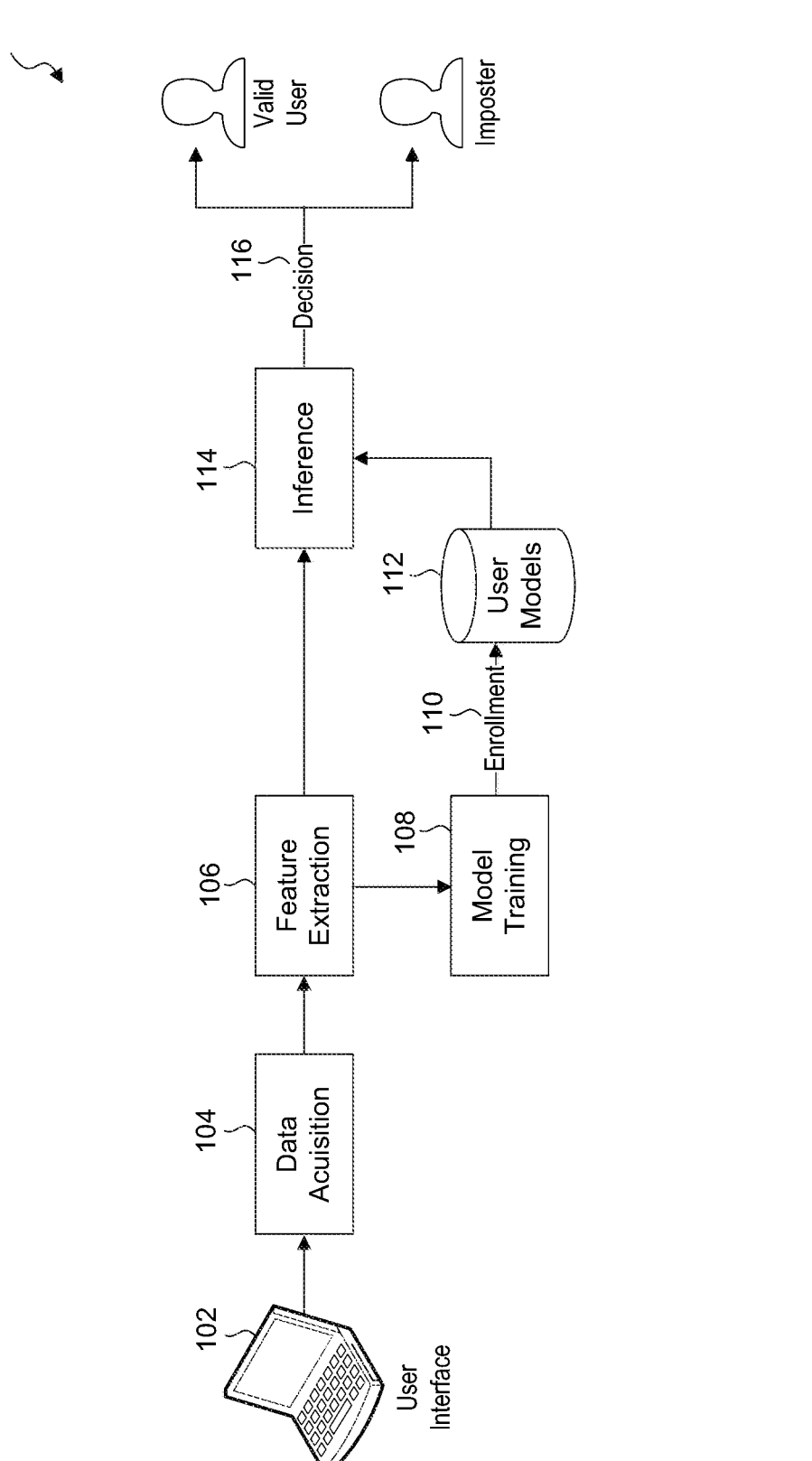
FIG. 1 depicts an example biometric recognition system in accordance with an embodiment.

As mentioned in the Background Section, above, the increasing complexity of security measures due to the emergence of different types of attacks demands multiple security techniques to effectively safeguard data and applications. One such technique is continuous authentication, which verifies a user's identity throughout the interaction with a system by continuously monitoring and evaluating behavioral and biometric user data. However, creating a classifier for continuous authentication requires a large amount of user data, which in most cases is highly sensitive, causing its disclosure to violate privacy and security.

A protocol for privacy-preserving continuous authentication based on secure multi-party computation (MPC) is described herein that addresses the foregoing issue. The protocol allows multiple parties to compute a joint result on their input data without disclosing it. In an embodiment, a three-party protocol is implemented that comprises a client with its user data, and two servers responsible for computing the classification, using the decision tree learning algorithm as the underlying classifier. Such embodiment may employ various methods of MPC to compute the classification outcome on the encrypted input through mutual interaction, while safeguarding the sensitive user data as well as the trained classifier.

As technology continues to evolve, security measures have become increasingly complex. This is due to the emergence of different types of attackers and attacks. There are two main types of attackers: those from inside and those from outside. Attackers from inside are typically individuals who have legitimate access to a system or network, such as employees or contractors. They may intentionally or unintentionally cause harm to the system, either through malicious activity or through negligence. Attackers from outside are individuals or groups who attempt to gain unauthorized access to a system or network from the outside. These attackers may use a variety of tactics, such as phishing, social engineering, or brute force attacks, to gain access to a system. In order to effectively safeguard data and applications against these threats, multiple security techniques are required. One of these is the authentication of a user to verify the real identity before granting access to a system or resource. This is typically done by applying initial authentication mechanisms, such as passwords, multifactor authentication, digital certificates, and even biometrical data. However, initial authentication may not be sufficient in various scenarios. Users may, for instance, choose weak passwords, forget to sign out from a system, and even forget to lock their personal device, allowing access to adversaries. Therefore, a mechanism that authenticates a user during the entire session may be deemed preferable.

Individuals have unique patterns of behavior that can be analyzed to identify and authenticate them while using a device or service. For computers and mobile devices, keystroke dynamics, mouse dynamics, touch and swipe patterns, phone orientation, and gait recognition, as well as the physical location and the time zone are some factors that contribute to such a pattern. Continuous authentication makes use of these patterns and provides a novel security mechanism that verifies the identity of a user throughout the interaction with a system by continuously monitoring and evaluating behavioral and biometric user data, creating a unique biometric data profile. The process typically involves acquiring behavioral user data, deriving suitable features from it, and creating a classification model for each user based on a machine learning algorithm. The trained classification model is then used to authenticate the user during the session and, depending on the respective outcome, appropriate measures are taken based on the criticality of the action being performed. Continuous authentication has a wide range of applications, ensuring authorized access to critical infrastructure in domains such as online banking and financial services, e-commerce transactions, medical applications accessing sensitive healthcare data, smart homes and mobile devices, and identity access management in enterprise applications.

Creating a classifier for continuous authentication assumes the application of machine learning, which requires a large amount of user data for training the classifier. However, behavioral and biometric user data are highly sensitive, and disclosure of such data is a serious violation of privacy and security. Moreover, if such data were to fall into the wrong hands, it could be used to forge the identity of other users to circumvent the security mechanisms of continuous authentication, thereby enabling a bad actor to infiltrate and cause harm to the system (e.g., by stealing, changing or destroying files and data, installing malware, rendering software or hardware inoperable, or the like). Likewise, disclosure of the trained classification model puts the user's identity at risk. The sensitivity of a machine learning model can arise from two different sources. Firstly, the trained model parameters itself may contain sensitive information. Secondly, the model may have been created using sensitive data. It is well established that gaining access to a machine learning model, whether through white-box or black-box access methods, can lead to model inversion attacks, compromising the privacy of the sensitive data. Therefore, it is crucial to find an approach of classifying the identity of users while protecting behavioral and biometric user data as well as the trained classifier.

In order to protect both the user data and the trained classifier, certain embodiments described herein apply Secure Multi-Party Computation (MPC), which is a cryptographic concept that allows multiple parties to compute a joint result on their input data without disclosing it to each other. A proposed implementation employs a three-party protocol that comprises a client with user data requiring classification for authenticity and two servers responsible for computing the classification. For the classification process, an embodiment utilizes a decision tree learning algorithm as the underlying classifier. At first, the data is encrypted by the client prior to the classification process to ensure its confidentiality. To safeguard the sensitive user data utilized for model training, each server obtains a partial share of the pre-trained decision tree model, which does not disclose the complete model. The servers then utilize various methods of MPC, more precisely additive homomorphic encryption and oblivious transfer, to interact with one another to compute the classification outcome on the encrypted input. Finally, the classification result is transmitted to the client and, depending on the outcome, appropriate measures are taken.

2. Preliminaries

Mathematical notations used in this disclosure are defined below in Table 3.

2.1. Continuous Authentication

When interacting with a device or service, individuals have a unique pattern of behavior that can be detected through various means. This pattern can be analyzed to help identify and authenticate the user. For computers and notebooks, keystroke dynamics and mouse dynamics are factors that contribute to the unique pattern of behavior. Keystroke dynamics involves analyzing an individual's typing speed, rhythm, and the time between keystrokes to create a unique profile. Mouse dynamics similarly evaluates an individual's mouse movement and clicking patterns to create such a profile. For mobile devices, touch and swipe patterns, phone orientation, and gait recognition are typical factors that contribute to the unique pattern of behavior. Touch and swipe patterns as well as the phone orientation are unique to each individual, and refer to the way that a user interacts with their mobile device. Gait recognition involves analyzing the way that an individual walks and moves, which can be detected through the use of accelerometers and gyroscopes in a mobile device. Apart from these device-specific factors (which are presented by way of example only and not limitation), location, time zone, and still other factors can serve as additional parameters to evaluate the credibility of the identity provided by the user.

This unique pattern of behavior can be used to implement an additional security mechanism, called continuous authentication, that constantly verifies the identity of a user throughout the interaction with a system, rather than just at the initial login. To achieve that, behavioral and physiological biometrics are continuously monitored, tracked, and analyzed through background processes that the user is unaware of. Based on the collected data, a unique biometric data profile is created, which is then used to authenticate the user. In this regard, FIG. 1 depicts a procedure 100 of an example biometric recognition system, comprising six phases that are performed as background processes during the interaction with a user interface. These phases are data acquisition 104, feature extraction 106, model training 108, user enrollment 110, inference 114 and decision-making 116. The model training and user enrollment phases may only be performed only once.

As shown in FIG. 1, procedure 100 starts with the user interacting with a user interface 102 that acquires raw user data for the creation and application of a data profile.

As would be apparent to persons skilled in the relevant art(s), there is a wide variety of behavioral data that can be collected by such a system. For example, it has been demonstrated that using mouse dynamics as the sole basis for continuous authentication is already sufficient to achieve accurate results. In order to form a basis for the conception of continuous authentication, the Balabit Mouse Dynamics Challenge was initiated to provide a behavioral data set for cursor movements. Table 1 shows an extract of the raw mouse dynamics data from the Balabit Mouse Dynamics Challenge data set:

TABLE 1

| record timestamp | client timestamp | button | state | x | y |
|---|---|---|---|---|---|
| 0.0 | 0.0 | NoButton | Move | 129 | 337 |
| 0.0 | 0.016 | NoButton | Move | 136 | 337 |
| . . . | . . . | . . . | . . . | . . . | . . . |
| 0.778 | 0.843 | Left | Pressed | 500 | 123 |
| 0.863 | 0.921 | Left | Released | 500 | 123 |
| . . . | . . . | . . . | . . . | . . . | . . . |

In the next phase, the time steps are grouped into segments, each describing one action. The actions are then used to derive suitable features which are used to characterize the user. These features should preferably be universal, unique, invariant, measurable, hard to spoof, and reasonable in the respective application or environment. The extracted features are then used to create a data profile, specifically a classification model based on a supervised machine learning algorithm. This user-specific classification model contains the unique features that are specific to a user, which is finally stored in a dedicated database of user models 112 and will be used for authentication during the session.

After user enrollment 110, the system can apply continuous authentication during later sessions. The trained classification model is used to perform inference 114 on the monitored data. This allows the classifier to make a decision 116 based on the current user's behavior, determining whether it corresponds to a valid user or an imposter. Based on the criticality of the action being performed, appropriate measures are taken, such as requesting to sign in again or to taking additional security measures.

2.2 Decision Trees

There are various classifiers that are based on supervised learning. Possible examples in the context of continuous authentication are k-nearest neighbors, decision trees, random forests, or even neural networks. In embodiments described herein, decision trees (DT), also called regression trees, are utilized as the underlying classification algorithm. A decision tree is a supervised learning algorithm that is utilized for classification tasks. It has a hierarchical, binary tree structure, which consists of inner or decision nodes, leaf nodes, and edges that connect different nodes to each other. Each inner node is marked with a test condition, and each leaf node is marked with a classification label. The test conditions are value comparisons of a given threshold value with a feature attribute of the input to be classified. Applying the decision tree algorithm, which is also referred to as inference process, means traversing a path within the tree based on the given input and arriving at one of the possible classification labels of the respective leaf node.

In the following description, the structure of a DT model is introduced, including its individual components and the holistic application of the model. A decision tree is composed of the binary tree as the underlying data structure. Binary trees appear in numerous types, such as full or proper binary trees, perfect binary trees, complete binary trees, balanced binary trees, and so forth.

In embodiments described herein, binary trees are represented as full binary trees, in which every tree node has either two or zero children. A full binary tree is a mathematical graph G=(V,E) with a hierarchical structure that consists of nodes, edges and paths.

In particular, the full binary tree includes 2m+1 nodes $(v_1, \ldots, v_{2m+1}) \in V$, with m decision nodes $(d_1, \ldots, d_m) \in D \subset V$ and m+1 leaf nodes $(l_1, \ldots, l_{m+1}) \in L \subset V$, so that $V=D \cup L$. The node indices are assigned by breadth-first search (BFS) traversal.

The full binary tree also includes 2m connection edges that are implied by $(e_1, \ldots, e_{2m}) \in E$, which is a subset of the Cartesian product $V \times V$, i.e., for each $e_i \in E$, there exists one pair of nodes $v_a, v_b \in V$ such that $e_i=(v_a, v_b)$. This gives G a coherent structure. Each decision node $v_i=d_j$ must be connected with two child nodes, where the first child is referred to as left child node $v_{2i}$ and the second one as right child node $v_{2i+1}$. Every node, except of the root node $v_1=d_1$, has an additional connection to its parent node $$v_{\left\lfloor \frac{i}{2} \right\rfloor}.$$

Connections to the child nodes are denoted as left edge and right edge, and connections to the parent node as parent edge. A leaf node has only one connection to its parent node and does not have any child nodes.

The full binary tree also includes m+1 paths, where each path is a sequence $P_k=(d_1, \ldots, d_j, l_k)$ starting from the root node $v_1$ and leading to a leaf node $l_k$. Each path additionally has a depth $\delta_k=|P_k|$, which is defined as the number of nodes within the path. The depth of the tree $\delta$ is defined as the depth of the longest path within the tree, i.e., $\delta:=\max(\delta k)$, $k \in [1,m+1]$.

Figure 2:
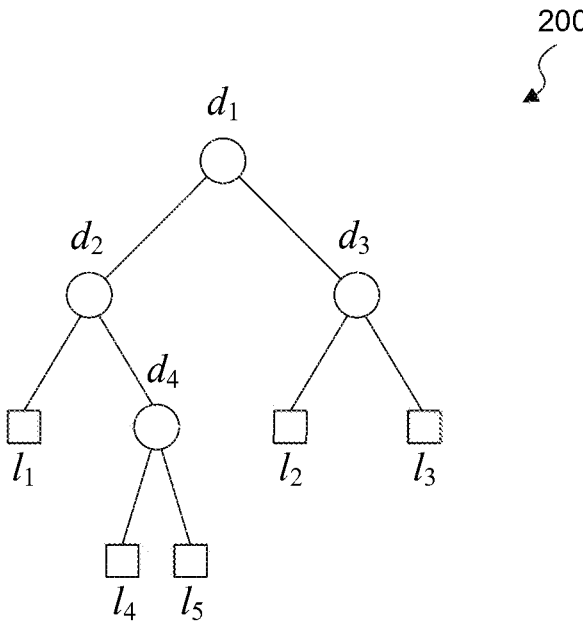
FIG. 2 illustrates an example of a full binary tree.

In FIG. 2, an example of a full binary tree 200 with m=4 decision nodes and a tree depth of $\delta=4$ is shown.

To arrive at a definition of a DT model as utilized by embodiments described herein, the foregoing definition of a full binary tree may be expanded with a few more attributes.

In particular, a decision tree (DT) or decision tree model may be defined as a multivariate function $\mathcal{T}: \mathbb{Z}^n \rightarrow \{0, 1\}$, that maps an n-dimensional attribute vector x to a classification label $c_k \in \{c_1, \ldots, c_{m+1}\}$ using a given binary tree G. In addition to the components of a binary tree G, a DT model comprises:

m threshold values $T=(t_1, \ldots, t_m)$ each of which is assigned to one decision node using an assignment function THR: $D \rightarrow \mathbb{Z}$ which takes a decision node $d_j$ and returns a corresponding threshold value $t_j$, m attribute indices $I=(i_1, \ldots, i_m)$ each of which is assigned to one decision node, using another assignment function ATT: $D \rightarrow [1, n]$, which takes a decision node $d_j$ and returns an attribute index i, and m+1 classification labels $c=(c_1, \ldots, c_{m+1})$ each of which is assigned to one leaf node by a labeling function LAB: $L \rightarrow \{c_1, \ldots, c_{m+1}\}$, that takes a given leaf node $l_k$ and returns a corresponding classification label $c_k$.

Given input data can be evaluated using the DT model. That is to say, inference may be run over an attribute or feature vector to retrieve a classification of the input. While the functions THR and ATT are required for the establishing the test conditions and correctly traversing G, LAB is used to finally retrieve the corresponding classification result.

Next, the application of the DT model as a function to classify arbitrary input data (also known as decision tree evaluation) is explained.

Given a DT model for DT evaluation, a bivariate comparison function COMP: $\mathbb{Z}^2 \rightarrow \{0, 1\}$ is defined which takes an input attribute $x_i \in \{x_1, \ldots, x_n\}$ and a threshold value, $t_j \in \{t_1, \ldots, t_m\}$, and computes the greater-or-equal (GEQ) test condition $[x_i \geq t_j] \in \{0, 1\}$.

To run inference on a given input x and a DT model $\mathcal{T}$, the process starts at the root node $v_1$. For each reached node $v_j$, the process evaluates $\text{COMP}(x_{ATT(vj)}, \text{THR}(v_j))$ to obtain a decision bit $b_j$. The process moves to the left child node if $b_j=0$ or to the right child node if $b_j=1$. This is repeated until a leaf node $l_k$ is reached so that finally the classification label of the leaf node $LAB(l_k)$ is returned as evaluation result. The evaluation result is denoted as $\mathcal{T}(x)$.

Figure 3:
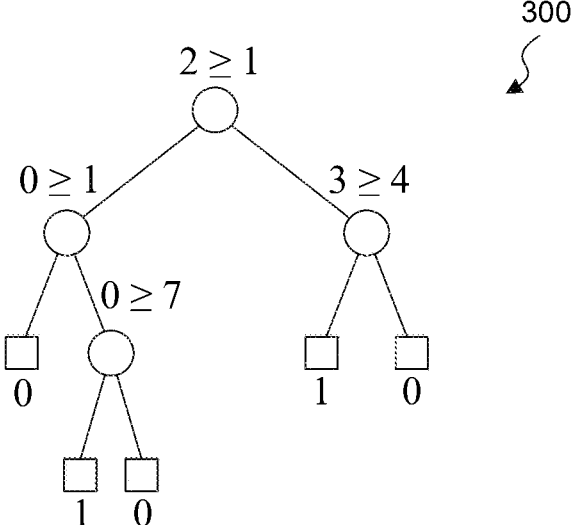
FIG. 3 illustrates an example of a decision tree evaluation using arbitrary data.

FIG. 3 shows an example of a decision tree evaluation 300 using arbitrary data, with given attributes x=(2, 3, 0), thresholds T=(1, 1, 4, 7), classification labels C=(0, 1, 0, 1, 0), and attribute assignments I=(1, 3, 2, 3). At first, the process compares $x_{i_1}=1$ and $t_1$ with the GEQ test condition, which evaluates to TRUE. Therefore, the process moves to the right child node and compare $x_{i_3}=2$ with $t_3$ which evaluates to FALSE. Hence, the process moves to the left child node, which is a leaf node, and retrieves the assigned classification label $LAB(l_2)=1$. As a result, the process traverses the path $P_2$ so that the input features x are classified with label 1 and are therefore evaluated as valid. The whole process is denoted as $\mathcal{T}(x)=1$.

2.3 Secure Multi-Party Computation

Both the input data and the trained parameters of the DT classifier contain behavioral user data. Since behavioral data is highly sensitive and disclosure of such data is a serious violation of privacy and security, privacy-preserving machine learning techniques may be applied as described herein. In particular, secure multi-party computation (MPC) may be applied as described herein, allowing model and data owners respectively to perform inference without any party learning additional information except their own. The MPC techniques for privacy-preserving inference with DT described herein include additive homomorphic encryption (AHE) and oblivious transfer (OT).

Additive Homomorphic Encryption.

AHE is a type of encryption scheme that allows performing arithmetic addition and scalar multiplication of ciphertexts, producing an encrypted outcome that yields the same result as if the operations were performed on plaintexts.

An encryption scheme may be defined as a set of three algorithms:

pk, sk←KEYGEN($\lambda$). This probabilistic algorithm takes a security parameter $\lambda$ and outputs a keypair, comprising a public key pk and a private key sk.

c←ENC(m, pk). This probabilistic algorithm takes the public key pk and a plaintext message m as inputs and outputs a ciphertext c. Herein, $[\![ m ]\!]$ will be used as a shorthand notation for ENC(pk, m).

m'←DEC(c, sk). This deterministic algorithm takes sk and a ciphertext c and outputs a plaintext message m', i.e., the decryption of the encrypted message m.

If public and private key are equal, i.e., pk=sk, then the encryption scheme may be called symmetric or secret-key encryption. Otherwise, it may be referred to as asymmetric or public-key encryption.

An encryption scheme whose ciphertexts are homomorphic regarding addition is referred to as additive homomorphic encryption scheme. More precisely, if one has an encryption function and two plaintext values $m_1$ and $m_2$, adding both values and encrypting their sum afterwards leads to the same result as encrypting both values first and then adding their ciphertexts using the AHE scheme. Therefore, besides the aforementioned algorithms associated with the definition of an encryption scheme, AHE schemes provide additional operations, as discussed below.

An additive homomorphic encryption scheme may be an encryption scheme that additionally provides the following methods:

$c_3$←ADD($c_1$, $c_2$, pk). This operation takes two ciphertexts $c_1 = [\![ m_1 ]\!]$ and $c_2 = [\![ m_2 ]\!]$ and performs homomorphic addition using the public key pk to compute an encrypted result $c_3$. Due to the scheme's property of homomorphism, the addition of ciphertexts yields the same result as the addition of two corresponding plaintexts ($m_1$ and $m_2$) and encryption of the resulting sum afterwards. As a shorthand notation, the following symbol for homomorphic addition of ciphertexts is introduced:

$$c_3 = c_1 \boxplus c_2 = [\![ m_1 + m_2 ]\!].$$

$c_3$←ADDCONST($c_1$, $m_2$, pk). This method takes a ciphertext $c_1 = [\![ m_1 ]\!]$ and plaintext value $m_2$ an performs arithmetic addition using pk to compute the encrypted result $c_3$. The same operator for homomorphic addition of ciphertext and plaintext values may be used:

$$c_3 = c_1 \boxplus m_2 = [\![ m_1 + m_2 ]\!].$$

$c_3$←MULTICONST($c_1$, $m_2$, pk). This method takes a ciphertext $c_1 = [\![ m_1 ]\!]$ and plaintext value $m_2$ and performs homomorphic scalar multiplication using pk to compute the encrypted result $c_3$. As a shorthand notation, we introduce the following symbol for homomorphic scalar multiplication:

$$c_3 = c_1 \boxdot m_2 = [\![ m_1 + m_2 ]\!].$$

$c_3$←INV(c, pk). This method takes a ciphertext $c = [\![ m_1 ]\!]$ and, using pk, returns a ciphertext encrypting the additive inverse of m:

$$c^{-1} = [\![ -m ]\!].$$

c←XOR(a, b, pk). This operation takes an encrypted bit $[\![ a ]\!]$ and a plaintext bit b, and performs a binary XOR operation using pk, with c being the encrypted result bit of the XOR operation. This is done by combining the ADD and MULTCONST methods together:

$$c = [\![ a ]\!] \otimes b = ((-1^b) \boxdot [\![ a ]\!]) \boxplus [\![ b ]\!] = [\![ a \boxplus b ]\!].$$

The $\oplus$ operator may be used to describe XOR operations with plaintexts and the $\otimes$ operator for XOR operations with ciphertext and plaintext values.

In embodiments, IND-CPA security and the following correctness conditions are required for all plaintexts $m_1$, $m_2$ and plaintext bits a, b:

$$DEC(\llbracket m_1 \rrbracket \boxplus \llbracket m_2 \rrbracket) = m_1 + m_2 \tag{1}$$

$$DEC(\llbracket m_1 \rrbracket \boxminus m_2) = m_1 + m_2 \tag{2}$$

$$DEC(\llbracket m_1 \rrbracket \boxdot m_2) = m_1 + m_2 \tag{3}$$

$$DEC(\llbracket m_1 \rrbracket^{-1}) = -m_1 \tag{4}$$

$$DEC(\llbracket a \rrbracket \otimes b) = a \oplus b \tag{5}$$

Common examples of AHE schemes known to persons skilled in the relevant art(s) are the Paillier or lifted Elgamal with elliptic curves (ECLE) schemes. However, such AHE schemes are provided herein by way of example and are not intended to be limiting.

Oblivious Transfer.

Figures 4, 5:
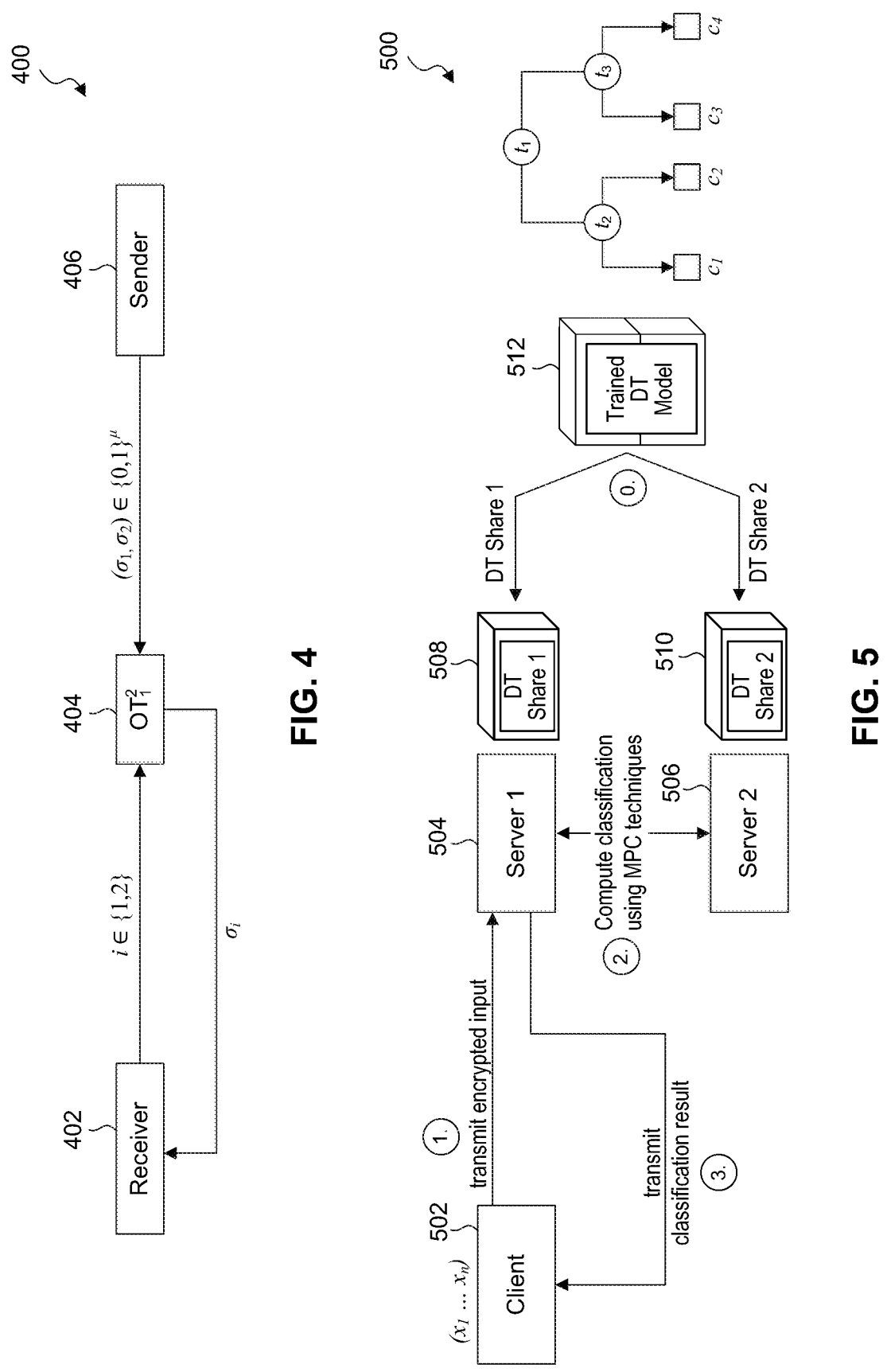
FIG. 4 illustrates a manner of operation of a 1-out-of-2 oblivious transfer (OT) protocol.
FIG. 5 is a block diagram of an example system that performs privacy preserving decision tree evaluation, according to some embodiments.

Oblivious transfer (OT) is a cryptographic protocol that enables a sender to transfer one out of several pieces of data elements to a receiver, without revealing which piece was chosen. There are different variations of OT, however, the fundamental variant is 1-out-of-2 OT, denoted by $OT_1^2$. FIG. 4 illustrates a manner of operation 400 of 1-out-of-2 OT.

In an $OT_1^2$ protocol, a sender 406 holds a pair of two values $(\sigma 0, \sigma 1) \in \{0, 1\}^\mu$, each having a bit length of $\mu$, and a receiver 402 is interested in obtaining the value at index i $\in \{1, 2\}$. As a result of the OT protocol 404, receiver 402 only learns $\sigma i$ without receiving any information about the other value, while sender 406 learns nothing about i, i.e., which element was requested by receiver 402.

$OT_1^2$ can be generalized to an 1-out-of-n-OT protocol $(OT_1^n)$, where the sender holds a set of n values $(\sigma 1, \ldots, \sigma_n)$ and the receiver is interested in obtaining the value at index i $\in \{1, \ldots, n\}$. $OT_1^n$ can be realized by performing log n $OT_1^2$ operations, or using more advanced techniques. While OT generally applies public-key cryptography, there is a variation based on symmetric-key operations, called OT extension (OTX). More precisely, OTX splits the transfer protocol into an offline and online phase.

The offline component relies on asymmetric cryptography to generate a finite set of what are referred to as base or seed oblivious transfers. These base OTs can be subsequently expanded in the online phase to an indefinite number of oblivious transfers, accomplished solely through operations involving symmetric cryptography. This can be regarded as the OT equivalent of hybrid encryption.

3. Privacy Preserving Decision Tree Evaluation

FIG. 5 is a block diagram of an example system 500 that performs privacy preserving decision tree evaluation in accordance with an embodiment. Example system 500 of FIG. 5 implements a three-party MPC protocol. In particular, example system 500 comprises a client 502 that wants to classify its input and two servers 504 and 506 that compute the classification. Each of client 502, server 504, and server 506 may be implemented by or on a corresponding computing device or computer system (such as computer system 1500 described below in reference to FIG. 15). Furthermore, each of client 502, server 504, and server 506 may be implemented by or on a corresponding physical machine or a virtual machine.

The input of client 502 is encrypted using AHE and remains hidden to both server 504 and server 506 throughout the entire inference process. Both servers 504 and 506 receive a share of the previously trained DT model 512, so that none of them learns the complete DT model's structure and thresholds. In particular, server 504 receives a DT share 508 and server 506 receives a DT share 510. Both servers then communicate with each other to compute the classification result over the encrypted input using their model shares and MPC techniques, i.e., AHE and OT. Finally, the classification result is transmitted to client 502.

In the following, each step of the protocol is explained in detail. Also, in the following, client 502 is referred to as "CLIENT", server 504 is referred to as "SERVER 1" and server 505 is referred to as "SERVER 2".

3.1 Initialization

At first, each server creates its individual key pair $(pk_i, sk_i)$, where i denotes the respective server index. The CLIENT can access both public keys $pk_1$ and $pk_2$ and uses $pk_2$ to encrypt its input. Let $x=(x_1, \ldots, x_n)$ be the CLIENT input, consisting of n feature attributes, and let each attribute $x_i \in \mathbb{Z}$ be encoded as a tuple of $\mu$ bits. Then, the CLIENT input is defined as $$x = (x_1, \ldots, x_n) = \begin{pmatrix} x_{11} & \cdots & x_{1\mu} \\ \vdots & \ddots & \vdots \\ x_{n1} & \cdots & x_{n\mu} \end{pmatrix}, x_{ij} \in \{0, 1\},$$

where the rows of the matrix represent the individual attributes $x_i \in x$ and the columns represent the individual bit $x_{ij}$ at index j within the bit-encoding of attribute $x_i$.

Figure 6:
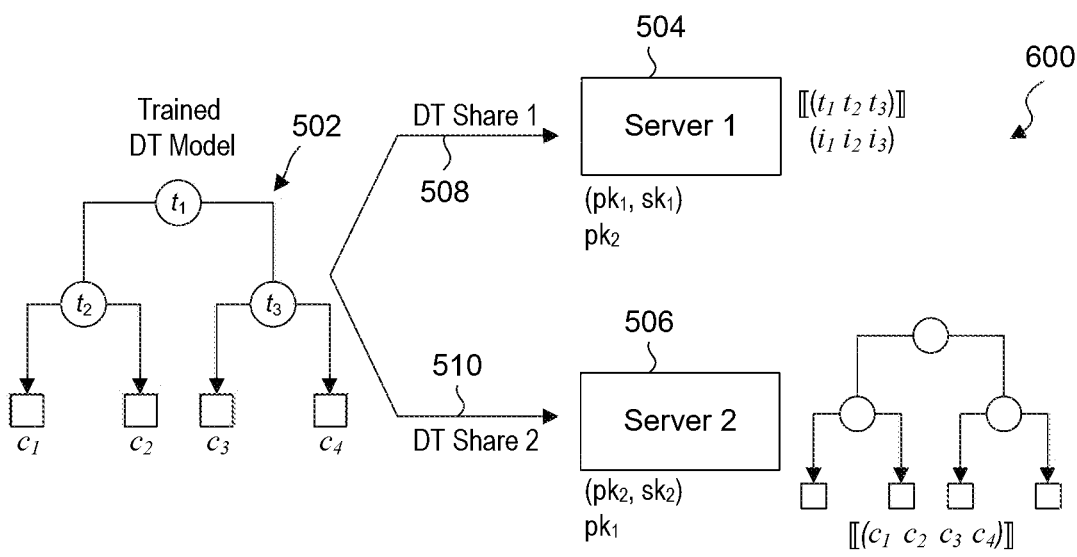
FIG. 6 depicts an overview of decision tree sharing in an initialization phase of a process for performing privacy preserving decision tree evaluation.

It is assumed that a trained decision tree model is given, i.e., a binary tree consisting of decision and leaf nodes, a classification label for each leaf node, and a threshold value for each decision node that is determined during the training phase of the DT model. The DT is then divided into two separate shares that are transmitted to each server respectively by an administrative entity, a process 600 which is depicted in FIG. 6.

The first DT share, which is passed to SERVER 1, consists of two elements. The first element is a tuple of m thresholds, where each threshold is encrypted bitwise given a bit length $\mu$, i.e., $$\llbracket T \rrbracket_{pk_2} = (\llbracket t_1 \rrbracket_{pk_2}, \ldots, \llbracket t_m \rrbracket_{pk_2}) = \begin{pmatrix} \llbracket t_{11} \rrbracket_{pk_2} & \cdots & \llbracket t_{1\mu} \rrbracket_{pk_2} \\ \vdots & \ddots & \vdots \\ \llbracket t_{m1} \rrbracket_{pk_2} & \cdots & \llbracket t_{m\mu} \rrbracket_{pk_2} \end{pmatrix}, t_{ij} \in \{0, 1\},$$

The second element is a tuple of attribute indices, denoted as $$I = (i_1, \ldots, i_m), i_j \in [0, n].$$

Given x and T, the protocol uses I to define a relation between their components, such that each threshold $t_j$ is related to an input attribute $x_{(ij)}$ via GEQ test condition $[x_{(ij)} \geq t_j]$ that is performed at each inner node $d_j$ during decision tree evaluation.

As previously discussed, in an embodiment, the underlying binary tree is a full tree and accordingly does not necessarily have to be a complete binary tree. Therefore, the given tuple of encrypted thresholds and attribute indices does not indicate the actual alignment between the nodes. Furthermore, all threshold values are encrypted under the public key $pk_2$ of SERVER 2 and are thus illegible to SERVER 1. Consequently, the first DT share does not reveal any sensitive information about the trained DT model and thus any inferable user data.

The second share, transmitted to SERVER 2, consists of a description the tree structure given by G and a tuple of classification labels encrypted by $pk_1$. The tree structure may be denoted as the set of all inner and leaf nodes including the node edges but without the associated thresholds and classification labels. Since the tree structure alone is not sufficient to determine sensitive information of the trained model, the second share analogously does not reveal any sensitive user data and the actual DT model remains hidden to both servers. FIG. 6 and Table 2 give an overview of the DT sharing process including the components of each share. Beyond that, it is presumed that both servers are under separate administration so that no supplementary information is shared apart from that which is explicitly outlined in the protocol.

Table 2 below provides an overview of the shares of the decision tree model, consisting of the binary tree structure G, the thresholds T, the input feature assignments I, and the classification labels C:

TABLE 2

| DT Share 1 | Public Parameters | DT Share 2 |
|---|---|---|
| $[\![T]\!]_{pk_2}$, I | n, m | G, $[\![c]\!]_{pk_1}$ |

3.2 Comparison Computation

As mentioned before, the CLIENT's input is encrypted before transmitting it to SERVER 1 over a network channel. To make the input illegible to SERVER 1, $pk_2$ is applied so that the encrypted input is defined as $$[\![x]\!]_{pk_2} = ([\![x_1]\!]_{pk_2}, \ldots, [\![x_n]\!]_{pk_2}) = \begin{pmatrix} [\![x_{11}]\!]_{pk_2} & \cdots & [\![x_{1\mu}]\!]_{pk_2} \\ \vdots & \ddots & \vdots \\ [\![x_{n1}]\!]_{pk_2} & \cdots & [\![x_{n\mu}]\!]_{pk_2} \end{pmatrix}, x_{ij} \in \{0, 1\},$$

The input vector is encrypted bitwise, i.e., for n features with $\mu$ bits per feature there are in total $n \cdot \mu$ ciphertexts contained in $[\![x]\!]_{pk_2}$.

SERVER 1 receives $[\![x]\!]_{pk_2}$ and computes several integer comparisons of encrypted values using AHE. For example, in accordance with techniques described in Tueno et al., "A method for securely comparing integers using binary trees", Cryptology ePrint Archive (2021) ("Tueno et al.", the entirety of which is incorporated by reference herein), the encrypted input attributes $[\![x_i]\!]_{pk_2}$ are compared to corresponding encrypted thresholds $[\![t_j]\!]_{pk_2}$ as shown in Algorithm 1:

Algorithm 1 Comparison of input attributes and thresholds

Require: T, X
    for all $i_j \in$ I do

12

-continued

Algorithm 1 Comparison of input attributes and thresholds $b_j \leftarrow [x_{(i_j)} > t_j]$
    end for
    return B = (b_1, ..., b_m)

At each decision node, the comparison result $b_j$ is defined as a boolean value of a greater-or-equal comparison, i.e., $b_j := [x_{ij} \geq t_j]$, so that $b_j$ is evaluated to 1 if $x_{ij} \geq t_j$, and 0 otherwise.

Figure 7:
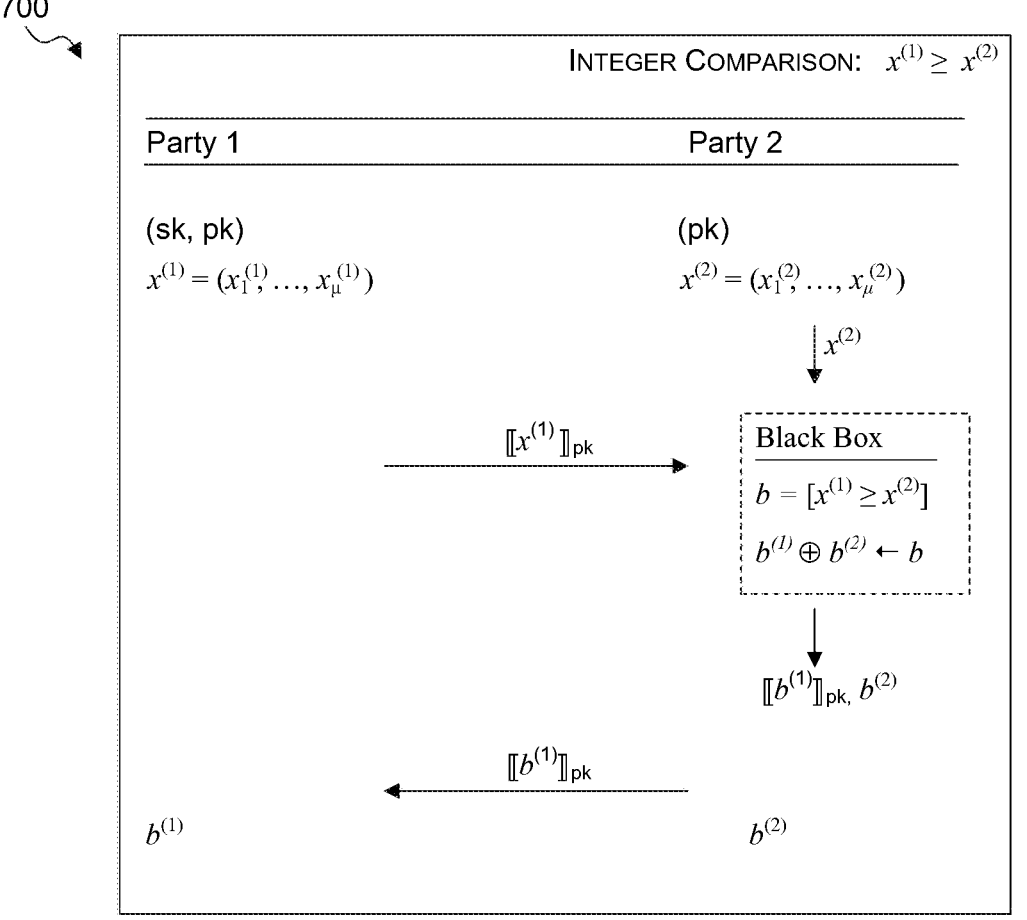
FIG. 7 shows an overview of an applied integer comparison protocol used to perform privacy preserving decision tree evaluation, according to some embodiments.

FIG. 7 shows an overview 700 of the applied integer comparison protocol of Tueno et al. for the comparison of two integers $x^{(1)}$ and $x^{(2)}$, consisting of a tuple of $\mu$ bits respectively. In the context of the decision tree evaluation performed by the system of FIG. 5, $x^{(1)}$ represents the respective input attribute $x_{(ij)}$, and $x^{(2)}$ represents the corresponding threshold value $t_j$.

To apply an integer comparison of two integers among two parties, the first party creates a keypair (sk, pk) and shares its public key pk with the second party. Both parties have an integer consisting of a tuple of $\mu$ bits and want to learn the comparison result, i.e., whether $x^{(1)} \geq x^{(2)}$, without disclosure of the actual values. After transmission of its encrypted input $[\![b^{(1)}]\!]_{pk}$, the second party performs integer comparison over encrypted data using AHE. The detailed comparison procedure is depicted as a black box for simplification and can be reviewed in Tueno et al. Essentially, inside the black box, the comparison result a is computed and split into two shares $b^{(1)}$ and $b^{(2)}$ that satisfy $b^{(1)} \oplus b^{(2)} = b$. However, the interior of the black box is not accessible to the second party but only the shares are revealed as a result of the black box function, whereby the first share $b^{(1)}$ is encrypted. Finally, the encrypted first share is passed to the first party, so that both parties now hold their share of the comparison result. The individual share does not reveal the actual value of but only the combination of both values does.

In the context of the system of FIG. 5, this procedure is applied to the case where multiple attributes of x are compared to multiple thresholds of T alongside the decision nodes of J, and Party 1 is represented by the CLIENT and Party 2 by SERVER 1. As shown in Algorithm 1, the comparison result of each decision node is contained in $B \in \{0, 1\}^m$. Each component of B at index j in turn is split into its shares $b_j^{(1)}$ and $b_j^{(2)}$, resulting in two tuples of shares $B^{(1)}$ and $B^{(2)}$, where the upper index denotes the affiliation to the respective server. After execution of the functionality contained in the black box, SERVER 1 obtains its share as plaintext and the second share as ciphertext. It encrypts the first share using its public key and passes both shares to SERVER 2, which decrypts its share and derives the encrypted comparison results $[\![B]\!]_{pk_1}$ by means of component-wise homomorphic XOR operation of both shares, i.e., $$[\![b_j^{(1)}]\!]_{pk1} \otimes b_j^{(2)} = [\![b_j]\!]_{pk1}, \text{ for each } j \in [1, m]$$

Figure 8:
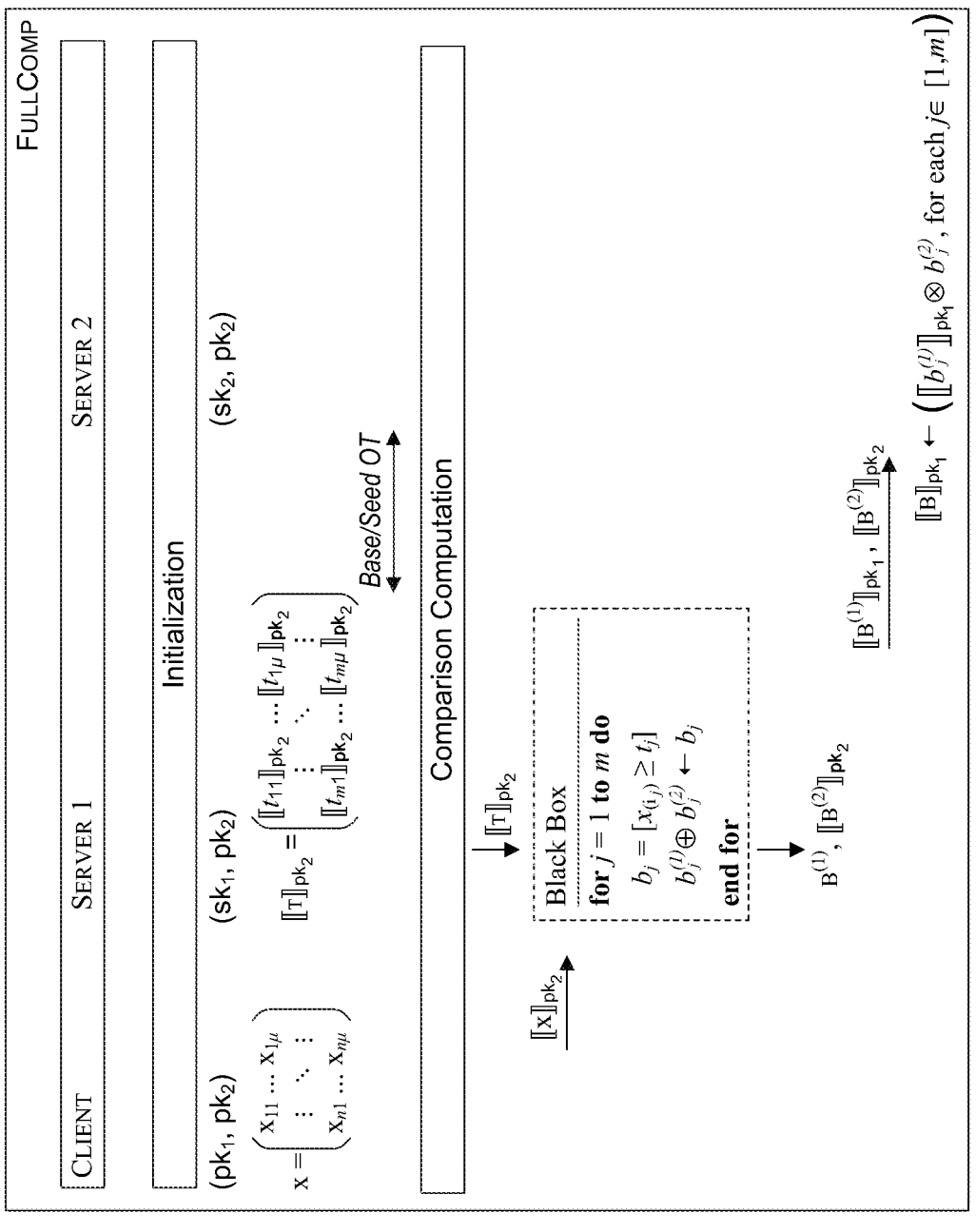
FIG. 8 shows an application of a secure integer comparison protocol for a component-wise comparison of an attribute vector and a threshold vector to perform privacy preserving decision tree evaluation, according to some embodiments.

FIG. 8 shows an application 800 of the secure integer comparison protocol of Tueno et al. for the component-wise comparison of attribute vector x and threshold vector T.

The operations of this section, performed by the SERVER 1, are summarized by $$B^{(1)}, [\![B^{(2)}]\!]_{pk_1} \leftarrow FULLCOMP([\![x]\!]_{pk_2}, [\![T]\!]_{pk_2}),$$

with $B^{(1)}=(b_1^{(1)}, \ldots, b_m^{(1)})$ being the tuple of comparison bit shares of SERVER 1 and $[\![B^{(2)}]\!]_{pk_1}=([\![b_1^{(2)}]\!]_{pk_1}, \ldots, [\![b_m^{(2)}]\!]_{pk_1})$ being the tuple of encrypted comparison bit shares of SERVER 2. Both shares are transmitted to SERVER 2, which decrypts its tuple of shares $B^{(2)}$ and derives the entire comparison result $[\![B]\!]_{pk_1}$ using component-wise homomorphic XOR operations, i.e., $$[\![B]\!]_{pk_1} = [\![B^{(1)}]\!]_{pk_1} \otimes DEC([\![B^{(2)}]\!], sk_2) = ([\![b_j^{(i)}]\!]_{pk_1} \otimes DEC([\![b_j^{(2)}]\!], sk_2),$$

$$\text{for each } j \in [1, m]).$$

The actual comparison results, however, are encrypted and remain illegible to SERVER 2, so that no sensitive information is revealed. In summary, the process of deriving the entire comparison results, performed by SERVER 2, is denoted by $$[\![B]\!]_{pk_1} \leftarrow EVALCOMP([\![B^{(1)}]\!]_{pk_1}, B^{(2)}).$$

3.3 Edge Labeling

Figure 9A:
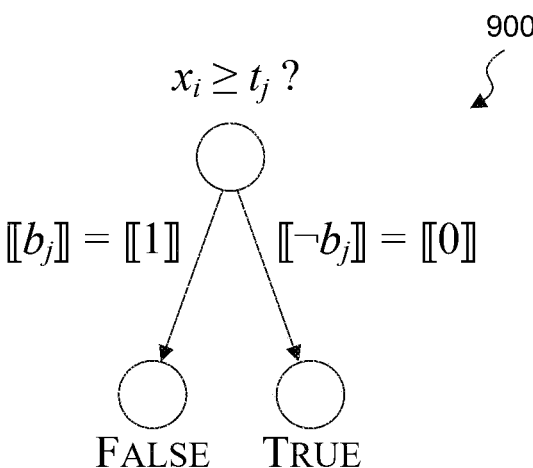
FIG. 9A illustrates evaluation of a decision node to TRUE and assignment of a comparison result to a corresponding edge for determination of a traversing direction as part of performing privacy preserving decision tree evaluation, according to some embodiments.
Figure 9B:
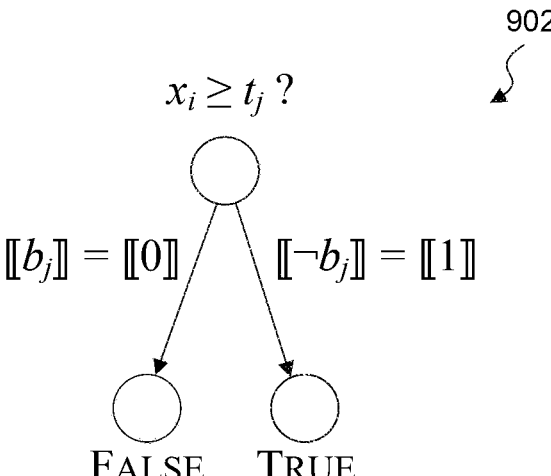
FIG. 9B illustrates evaluation of a decision node to FALSE and assignment of a comparison result to a corresponding edge for determination of a traversing direction as part of performing privacy preserving decision tree evaluation, according to some embodiments.

Now, as SERVER 2 obtained the encrypted comparison results described by tuple B, the decision tree is applied to evaluate the CLIENT input in order to determine the according classification label. This is done by traversing the tree and assigning the tree edges with the corresponding components of vector B. FIGS. 9A and 9B outline the performed operations at each node during the traversing of the tree.

In particular, FIGS. 9A and 9B depict evaluation of a decision node and assignment of comparison result to the corresponding edge for determination of the traversing direction. It is noted that all the values are encrypted by $pk_1$ and thus illegible to SERVER 2. Furthermore, SERVER 2 only receives the computation results but neither input x nor thresholds T that are shown for the sake of clarity.

The process starts at the first inner node, i.e., the root node. If the assigned comparison evaluates to TRUE, the tree is traversed to the right child node, otherwise to the left child node and the process is repeated until a leaf node is reached. Since the actual traversed path depends on input x, the process uses the comparison result B to mark the traversed edges. In further accordance with the process, the value of a traversed edge is set to 0, and 1 otherwise, for reasons that will be explained in a subsequent section. In the example 900 of FIG. 9A, we see that the comparison is evaluated to True, so that the tree needs to be traversed to the right child node. Therefore, the process sets the outgoing right edge to 0 by flipping the result bit $b_j$, and the outgoing left edge to 1, i.e., $b_j$. In the contrary example 902 of FIG. 9B, where $x_i < t_j$, the process does the same so that the left edge is set to the comparison result bit 0 and the right edge is set to the inverted result 1. This procedure may be denoted as edge labeling.

The process of edge labeling may be defined as follows. Each decision node $v_j$ is associated with an integer comparison operation $[\![x_i]\!] \geq [\![t_j]\!]$. For each $v_j$, the process therefore computes the decision bit $[\![b_j]\!] = [\![x_i]\!] \geq [\![t_j]\!]$, denoted as the comparison result, and labels the left outgoing edge with $[\![b_j]\!]$, and the right outgoing edge with $[\![\neg b_j]\!]$.

Figures 10, 11:
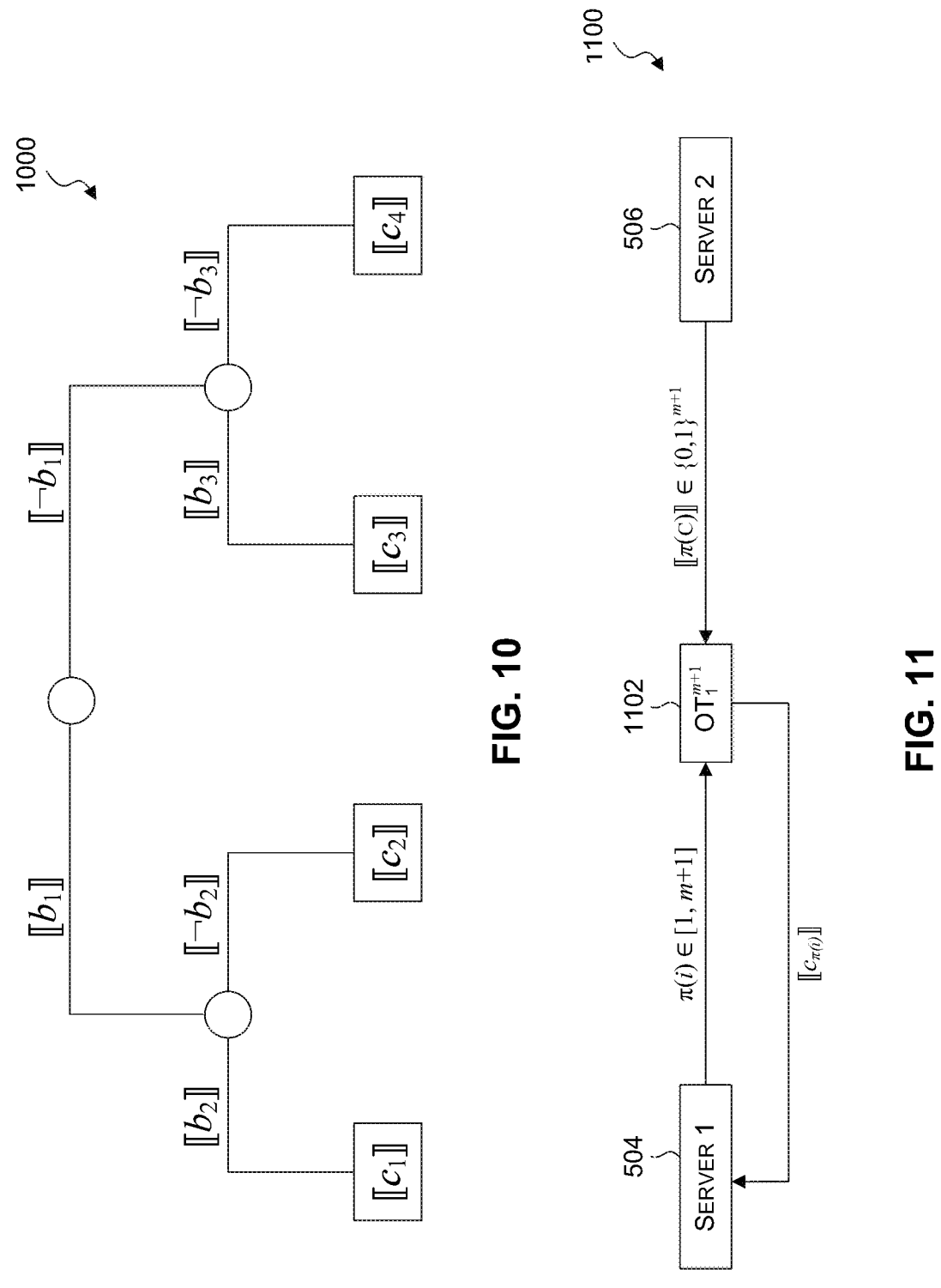
FIG. 10 shows an example of edge labeling of three decision tree nodes with encrypted comparison results as part of performing privacy preserving decision tree evaluation, according to some embodiments.
FIG. 11 depicts a 1-out-of-(m+1) oblivious transfer process carried out as part of performing privacy preserving decision tree evaluation, according to some embodiments.

FIG. 10 shows the edge labeling of three decision nodes of a tree 1000 with m=3 with the encrypted comparison results (encrypted with $pk_1$) computed by SERVER 1. As previously described, it can be observed that SERVER 2 simply assigns each outgoing left edge to comparison result $b_j$ and each outgoing right edge to its inversion $\neg b_j=1-b_j$.

The functionality introduced in this section may be denoted as:

$$G' \leftarrow LABEDGES(\mathcal{T}, [\![B]\!]_{pk_1}),$$

taking the decision tree model $\mathcal{T}$ and the comparison result shares as inputs and outputting the updated binary tree of the DT model G', where each tuple $ei=(v_a, v_b) \in E$ is extended by a third value $b_j$ (respectively $1-b_j$).

3.4 Tree Evaluation

Following the edge labeling procedure, SERVER 2 must navigate the tree along the path wherein all edges are marked with 0, as this path signifies the traversal route for the provided input x, leading to the appropriate classification label $c_k$. This path will be referred to as the zero-path. However, since B and C are encrypted, every path has to be evaluated to identify the zero-path. The evaluation of a path may be denoted as path aggregation.

Path aggregation may be defined as follows. For a path $P_k$, as previously defined, where the edges are labeled in the manner described in the preceding section, its path aggregation may be defined as the sum of all edge labels along the path leading to the respective leaf node $c_k$. The resulting value is denoted as the associated path cost $p_k$.

The path costs of the entire tree is described by the tuple p of all individual path costs, $$P = (p_1, \ldots, p_{m+1}) \in \mathbb{Z}^{m+1},$$

with each component $p_k = \boxplus_{i=1}^{\delta_k-1} [\![b_{ki}]\!]$ being the sum of edge labels along the path $P_k$, with $k_i$ being the index of the decision bit associated with the ith edge within $P_k$. In the example of FIG. 10, P is evaluated to $$[\![P]\!]_{pk_1} = ([\![b_1]\!]_{pk_1} \boxplus [\![b_2]\!]_{pk_1}, [\![b_1]\!]_{pk_1} \boxplus [\![1-b_2]\!]_{pk_1},$$
$$[\![1-b_1]\!]_{pk_1} \boxplus [\![b_3]\!]_{pk_1}, [\![1-b_1]\!]_{pk_1} \boxplus [\![1-b_3]\!]_{pk_1}),$$

and a possible example of P, depending on the CLIENT input, could be $$[\![P]\!]_{pk_1} = ([\![1]\!]_{pk_1}, [\![0]\!]_{pk_1}, [\![1]\!]_{pk_1}, [\![2]\!]_{pk_1}).$$

With m=3 decision nodes, there are m+1=4 distinct paths where only one sum is evaluated to 0+0=0, one is evaluated to 1+1=2 and the other ones to 0+1=1+0=1. In the current state, P still reveals the tree structure allowing to reconstruct major parts of the tree if P was transmitted to SERVER 1 in the current state for classification determination. Therefore, each component is multiplied with an individual random scalar $r_k$ following permuting P by the use of a random permutation function $\pi$, thus resulting in $$\llbracket P' \rrbracket_{pk_1} =$$

$$\pi\left(R\boxdot\llbracket P\rrbracket_{pk_1}\right) = \left(r_{\pi(1)}\boxdot\overset{\delta_{\pi(1)}-1}{\underset{i=1}{\boxplus}}\llbracket b_{\pi(1)i}\rrbracket_{pk_1}, \ldots, r_{\pi(m+1)}\boxdot\overset{\delta_{\pi(m+1)}-1}{\underset{i=1}{\boxplus}}\llbracket b_{\pi(m+1)i}\rrbracket_{pk_1}\right).$$

The permutation function $\pi$ defines a fixed permutation and either takes an index $i \in \mathbb{Z}$ and returns the new index $\pi(i)$ after permutation, or takes a tuple N of arbitrary elements and returns the permuted tuple $\pi(N)$.

In further accordance with the foregoing example, let the permutation function be $$\pi = \begin{pmatrix} 1 & \ldots & n \\ \pi(1) & \ldots & \pi(n) \end{pmatrix} = \begin{pmatrix} 1 & 2 & 3 & 4 \\ 2 & 1 & 4 & 3 \end{pmatrix},$$

so that the components of $\llbracket p' \rrbracket_{pk_1}$ are evaluated to $$\llbracket p_1' \rrbracket_{pk_1} = r_2\boxdot\left(\llbracket b_1\rrbracket_{pk_1}\boxplus\llbracket b_2\rrbracket_{pk_1}\right) = \llbracket 0 \rrbracket_{pk_1},$$

$$\llbracket p_2' \rrbracket_{pk_1} = r_1\boxdot\left(\llbracket b_1\rrbracket_{pk_1}\boxplus\llbracket 1 - b_2\rrbracket_{pk_1}\right) = \llbracket r_1 \rrbracket_{pk_1},$$

$$\llbracket p_3' \rrbracket_{pk_1} = r_4\boxdot\left(\llbracket 1 - b_1\rrbracket_{pk_1}\boxplus\llbracket b_3\rrbracket_{pk_1}\right) = \llbracket 2 \cdot r_4 \rrbracket_{pk_1},$$

$$\llbracket p_4' \rrbracket_{pk_1} = r_3\boxdot\left(\llbracket 1 - b_1\rrbracket_{pk_1}\boxplus\llbracket 1 - b_3\rrbracket_{pk_1}\right) = \llbracket r_3 \rrbracket_{pk_1}.$$

SERVER 2 sends the encrypted, permuted, and randomized path evaluations in $\llbracket p'_1 \rrbracket_{pk_1}$ to SERVER 1, who learns nothing about the tree structure or the computed evaluations except that there is a zero-path at the index i, which is i=1 in this example.

In summary, the process aggregates all paths of the updated binary tree G' resulting in a tuple of associated costs for each path, where each component is individually randomized. Then the process selects a random permutation $\pi$ to permute the tuple of path costs. Finally, the resulting tuple is transmitted to SERVER 1 and the applied permutation function is kept for later operations. The entire procedure may be denoted by $$\llbracket P' \rrbracket_{pk_1}, \pi \leftarrow AGGRPATHS(G').$$

3.5 Classification Determination

The final phase of the protocol comprises the classification determination based on the computed results in $\llbracket P' \rrbracket_{pk_1}$. At first, SERVER 1 decrypts the components of $\llbracket P' \rrbracket_{pk_1}$ and identifies the zero-path, i.e., the index where $p'_j=0$, which is $j=\pi(i)=1$ in accordance with the previous example. As depicted in FIG. 11, both servers subsequently engage in an $OT^{m+1}$, denoted OT 1102 in FIG. 11. SERVER 1 takes on the role of the receiver, who now holds index $\pi(i)$, while SERVER 2 assumes the sender role, having a list of encrypted bits, i.e., the permuted tuple of classification labels, $$\llbracket \pi(C) \rrbracket_{pk_1} = \pi\left(\left(\llbracket c_1 \rrbracket_{pk_1}, \ldots, \llbracket c_{m+1} \rrbracket_{pk_1}\right)\right),$$

which is $(\llbracket c_2 \rrbracket_{pk_1}, \llbracket c_1 \rrbracket_{pk_1}, \llbracket c_4 \rrbracket_{pk_1}, \llbracket c_3 \rrbracket_{pk_1})$ in accordance with the foregoing example. As a result, SERVER 1 obtains the requested classification label $\llbracket c_{\pi(1)} \rrbracket_{pk_1}$ and decrypts it using $sk_1$ without learning anything else about the sender-side data. Likewise, SERVER 2 learns nothing about the receiver-side data.

If $c_{\pi(i)}=1$, the CLIENT is considered to be valid, otherwise, $c_{\pi(i)}=0$ and the CLIENT is invalid. This information is accordingly communicated to the CLIENT and appropriate actions are taken.

4. Summary

Table 3 shown below provides a list of notations, variables, and symbols used herein to describe an example protocol for performing privacy preserving decision tree evaluation:

TABLE 3

| Notation | Interpretation |
| --- | --- |
| $\llbracket x \rrbracket$ | Additive homomorphic encryption of a value x |
| $\llbracket x \rrbracket_{pk_i}$ | Additive homomorphic encryption of value x, encrypted with public key $pk_i$ |
| $\llbracket z \rrbracket = (\llbracket z_1 \rrbracket, \ldots, \llbracket z_n \rrbracket)$ | Additive homomorphic encryption of the tuple z = $(z_1, \ldots, z_n)$ |
| $\llbracket z \rrbracket_{pk_i} = (\llbracket z_1 \rrbracket_{pk_i}, \ldots, \llbracket z_n \rrbracket_{pk_i})$ | Additive homomorphic encryption of the tuple z = $(z_1, \ldots, z_n)$, encrypted with public key $pk_i$ |
| $\boxplus$ | Homomorphic addition of ciphertexts |
| $\boxdot$ | Homomorphic scalar multiplication of ciphertext and plaintext |
| $\oplus$ | XOR operation of plaintext bits |
| $\otimes$ | XOR operation of ciphertext bit and plaintext bit |
| $pk_i$ | AHE public key of SERVER i |
| $sk_i$ | AHE private key of SERVER i |
| $\lambda$ | The security parameter of the AHE keypair |
| $\kappa$ | A symmetric key |
| $\mu$ | Number of bits for a tuple component |
| $x = (x_1, \ldots, x_n) \in \mathbb{Z}^n$ | Input attribute tuple of CLIENT |
| $T = (t_1, \ldots, t_m) \in \mathbb{Z}^m$ | Tuple of DT thresholds |
| $C = (c_1, \ldots, c_{m+1}) \in \mathbb{Z}^{m+1}$ | Tuple of DT classification labels |

TABLE 3-continued

| Notation | Interpretation |
|---|---|
| $I = (i_1, \ldots, i_m) \in \mathbb{Z}^n$ | Tuple of input feature indices for comparison with corresponding DT threshold |
| $B = (b_1, \ldots, b_m) \in \{0, 1\}^m$ | The comparison result bits |
| $B^{(1)} = (b_1^{(1)}, \ldots, b_m^{(1)}) \in \{0, 1\}^m$ | The share of the comparison results of SERVER 1 |
| $B^{(2)} = (b_1^{(2)}, \ldots, b_m^{(2)}) \in \{0, 1\}^m$ | The share of the comparison results of SERVER 2 |
| $R = (r_1, \ldots, r_m) \in \{0, 1\}^m$ | Tuple of random values |
| $P = (p_1, \ldots, p_{m+1}) \in \mathbb{Z}^{m+1}$ | Path aggregation tuple |
| $G = (V, E)$ | A binary tree, i.e., a graph G with a set of nodes $V = D \cup L$ and edges $E \subset V \times V$ |
| $v_i \in V$ | A decision tree node |
| $d_j \in D \subset V$ | An inner (decision) node |
| $l_k \in L \subset V$ | A leaf node |
| $e_i = (v_a, v_b) \in E$ | A decision tree edge |
| $\delta$ | The depth of the decision tree |
| $\mathcal{T}(x) : \mathbb{Z}^n \to \{0, 1\}$ | The composite decision tree model function |
| $\pi$ | A permutation function |
| THR: $D \to \mathbb{Z}$ | Function for assigning a decision node $v_j$ with a threshold $t_j$ |
| ATT: $D \to [1, n]$ | Function for assigning a decision node $v_j$ to an attribute index i |
| LAB: $L \to (c_1, \ldots, c_{m+1})$ | Function for labeling a leaf node $l_k$ with a classification bit $c_k$ |
| KEYGEN | Function for generating an AHE keypair |
| ENC | Function for encrypting a plaintext for AHE |
| DEC | Function for decrypting a ciphertext |
| INV | Function for computing the additive inverse value of a ciphertext using AHE |
| ADD | Function for adding to ciphertexts using AHE |
| ADDCONST | Function for adding a plaintext value to a ciphertext by means of AHE |
| MULTICONST | Function for multiplying a ciphertext with a constant plaintext value using AHE |
| FULLCOMP | Function for comparison computation as described in Section 4.2 |
| EVALCOMP | Function for evaluating the full comparison computation result as described in Section 4.2 |
| LABEDGES | Function for labeling the DT edges as described in Section 4.3 |
| AGGRPATHS | Function for evaluation of DT paths as described in Section 4.4 |

Furthermore, FIG. 12 provides a concise overview 1200 of an example protocol implementation, comprising the five general phases of the protocol, the three partaking parties, and the communication among the parties.

The protocol as represented by FIG. 12 will now be described in reference to FIGS. 13A, 13B, 13C and 13D. In particular, FIGS. 13A, 13B, 13C and 13D collectively depict a flowchart of a method 1300 for evaluating a decision tree in a privacy preserving manner, according to some embodiments. Method 1300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 13A, 13B, 13C and 13D, as will be understood by a person of ordinary skill in the art.

Method 1300 shall be described with reference to the system of FIG. 5. However, method 1300 is not limited to that example embodiment.

During (or prior to) the input phase, in 1302, SERVER 1 is provided with: (a) a first public-private key pair, consisting of a first public key and a first private key; (b) a second public key, the second public key comprising part of a second public-private key pair provided to SERVER 2; and (c) a first partial share of a decision tree classifier, the first portion of the decision tree classifier consisting of: (i) a tuple of thresholds respectively associated with the decision tree nodes of the decision tree classifier, wherein each threshold in the tuple of thresholds is encrypted bitwise (using an AHE scheme) using the second public key; and (ii) a tuple of attribute indices respectively associated with the decision tree nodes of the decision tree classifier, each attribute index in the tuple of attribute indices indicating an input data attribute associated with a corresponding decision tree node.

During (or prior to) the input phase, in 1304, SERVER 2 is provided with: (a) the second public-private key pair, consisting of the second public key and a second private key; (b) the first public key; and (c) a second portion of the decision tree classifier, the second portion of the decision tree classifier consisting of: (i) a description of the tree structure of the decision tree classifier; and (ii) a tuple of classification labels respectively associated with the leaf nodes of the decision tree classifier, wherein each classification label is encrypted (using the AHE scheme) using the first public key.

During (or prior to) the input phase, in 1306, CLIENT is provided with the first public key and the second public key.

During the input phase, in 1308, CLIENT obtains input data comprising a set of attributes (e.g., user attributes) and encrypts bitwise (using an AHE scheme) each attribute of the input data using the second public key, thereby generating encrypted input data. During the input phase, in 1310, CLIENT also transmits the encrypted input data to SERVER 1 (which cannot be decrypted by SERVER 1 since it is encrypted with the second public key).

During the comparison computation phase, in 1312, SERVER 1 compares the encrypted input data to the encrypted thresholds using AHE to generate a comparison result for each of the decision nodes of the decision tree classifier (which means that the encrypted input data and the encrypted thresholds are never decrypted to plaintext), wherein each comparison result is represented by a first comparison result share in plaintext and a second comparison result share encrypted with the second public key (such that it cannot be decrypted by SERVER 1).

In 1314, SERVER 1 then encrypts (using AHE) each of the first comparison result shares using the first public key.

In 1316, SERVER 1 then transmits to SERVER 2 the comparison results, wherein each transmitted comparison result is represented by a first comparison result share encrypted with the first public key (such that it cannot be decrypted by SERVER 2) and a second comparison result share encrypted with the second public key.

In 1318, for each comparison result, SERVER 2 decrypts the second comparison result share using the second private key and then performs a homomorphic XOR operation of the first comparison result share encrypted with the first public key and the second comparison result decrypted to plaintext to generate a comparison result encrypted with the first public key (such that it cannot be decrypted by SERVER 2), wherein each comparison result is either a 1 if the comparison evaluated to true or a 0 if the comparison evaluated to false.

During the edge labeling phase, in 1320, for each decision node in the decision tree classifier, SERVER 2 labels a first outgoing edge (an edge corresponding to FALSE) of the decision node with the corresponding comparison result encrypted with the first public key and labels a second outgoing edge (an edge corresponding to TRUE) of the decision node with an inverse of the corresponding comparison result encrypted with the first public key. During the tree evaluation phase, in 1322, for each path from the root node of the decision tree to a respective leaf node, SERVER 2 calculates a path cost that represents a sum of the edge labels along the path, thereby generating a tuple of path costs each encrypted with the first public key (such that it cannot be decrypted by SERVER 2), wherein the path that leads to the classification result is the only path that has a path cost of zero (the zero-path).

In 1324, SERVER 2 multiplies each path cost in the tuple of path costs by a corresponding random scalar value and then applies a permutation function to rearrange an order of the path costs in the tuple of path costs, thereby generating a permuted and randomized tuple of path costs encrypted with the first public key. In 1326, SERVER 2 also permutes the tuple of classification labels encrypted with the first public key using the same permutation function.

In 1328, SERVER 2 then transmits the permuted and randomized tuple of path costs encrypted with the first public key to SERVER 1.

In the classification determination phase, in 1330, SERVER 1 uses the first private key to decrypt the permuted and randomized tuple of path costs to identify an index associated with the zero-path.

In 1332, SERVER 1 and SERVER 2 then engage in an oblivious transfer operation in which SERVER 1 obtains from SERVER 2 a classification label associated with the index associated with the zero-path and encrypted with the first public key without SERVER 2 learning the index associated with the zero-path and without SERVER 1 learning any classification labels associated with any of the other paths of the decision tree classifier.

In 1334, SERVER 1 uses the first private key to decrypt the classification label associated with the index associated with the zero-path.

In 1336, SERVER 1 then sends the classification label associated with the index associated with the zero-path to CLIENT.

FIG. 14 is a flowchart of a method 1400 for evaluating a decision tree in a privacy preserving manner, according to some embodiments. Method 1400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 14, as will be understood by a person of ordinary skill in the art.

Method 1400 shall be described with reference to the system of FIG. 5. However, method 1400 is not limited to that example embodiment.

In 1402, SERVER 1 receives a first partial share of the decision tree and encrypted input data from CLIENT, wherein the encrypted input data comprises a set of attributes. In 1404, SERVER 2 receives a second partial share of the decision tree.

In 1406, each of SERVER 1 and SERVER 2 communicate with the other server to compute a classification result over the encrypted input data using the respective partial share of the decision tree received thereby and secure multi-party computation methods, including additive homomorphic encryption and oblivious transfer, such that the classification result is determined without decrypting the encrypted input data, and such that the classification result is ultimately received by SERVER 1.

In 1408, SERVER 1 transmits the classification result to CLIENT.

In an embodiment of method 1400, the decision tree comprises a full binary decision tree.

In another embodiment of method 1400, the decision tree comprises a plurality of decision nodes and a plurality of leaf nodes, the first partial share of the decision tree comprises a tuple of thresholds respectively associated with decision nodes of the decision tree and a tuple of attribute indices respectively associated with the decision nodes of the decision tree, and the second partial share of the decision tree comprises a structural description of the decision tree and a tuple of classification labels respectively associated with the leaf nodes of the decision tree.

In further accordance with such an embodiment, the tuple of classification labels may be encrypted with a first public key that is paired with a first private key that is accessible to the first server but not the second server, and the tuple of thresholds may be encrypted with a second public key that is paired with a second private key that is accessible to the second server but not the first server.

In a further embodiment of method 1400, the set of attributes is associated with a user, the decision tree comprises a classification model trained on one or more previously-obtained sets of attributes associated with the user, and the classification result indicates whether the user should or should not be authenticated.

In further accordance with such an embodiment, the set of attributes associated with the user may comprise one or more of behavioral attributes associated with the user or biometric attributes associated with the user.

In still further accordance with such an embodiment, method 1400 may be performed as a part of a continuous authentication process used to determine whether the user should have continued access to a system or resource.

In a further embodiment of method 1400, the first server and the second server communicate with each directly. In an alternate embodiment, the first server and the second server communicate with each other indirectly via one or more intermediaries (e.g., intermediate physical or virtual machines, intermediate computing devices, or the like).

Figure 15:
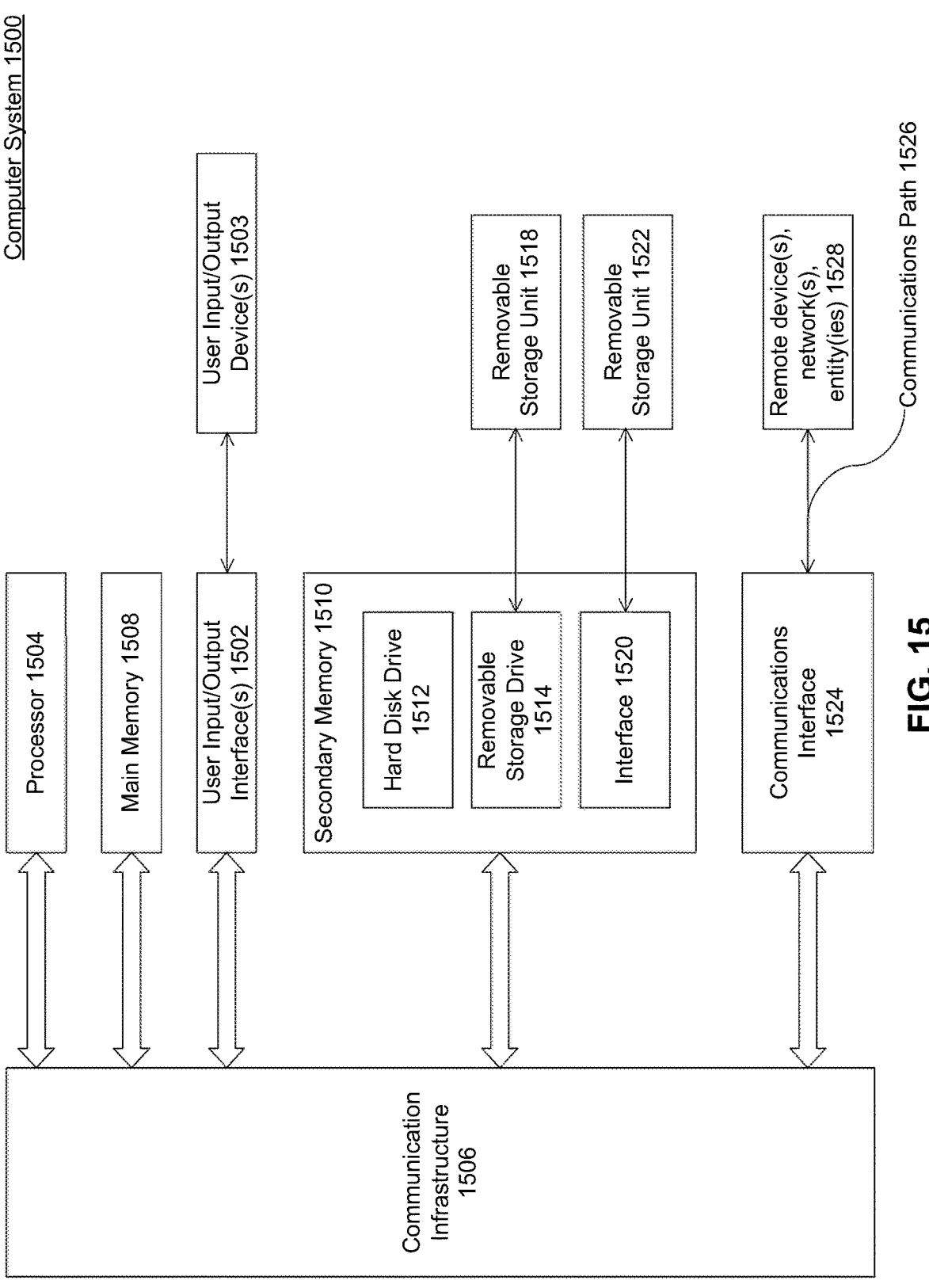
FIG. 15 is a block diagram of an example computer system useful for implementing various embodiments.

Various embodiments may be implemented, for example, using one or more well-known computer systems, such as computer system 1500 shown in FIG. 15. One or more computer systems 1500 may be used, for example, to implement any of the embodiments discussed herein, as well as combinations and sub-combinations thereof.

Computer system 1500 may include one or more processors (also called central processing units, or CPUs), such as a processor 1504. Processor 1504 may be connected to a communication infrastructure or bus 1506.

Computer system 1500 may also include user input/output device(s) 1503, such as monitors, keyboards, pointing devices, etc., which may communicate with communication infrastructure 1506 through user input/output interface(s) 1502.

One or more of processors 1504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1500 may also include a main or primary memory 1508, such as random access memory (RAM). Main memory 1508 may include one or more levels of cache. Main memory 1508 may have stored therein control logic (i.e., computer software) and/or data.

Computer system 1500 may also include one or more secondary storage devices or memory 1510. Secondary memory 1510 may include, for example, a hard disk drive 1512 and/or a removable storage device or drive 1514. Removable storage drive 1514 may be a floppy disk drive, a magnetic tape drive, a compact disk drive, an optical storage device, tape backup device, and/or any other storage device/drive.

Removable storage drive 1514 may interact with a removable storage unit 1518. Removable storage unit 1518 may include a computer usable or readable storage device having stored thereon computer software (control logic) and/or data. Removable storage unit 1518 may be a floppy disk, magnetic tape, compact disk, DVD, optical storage disk, and/any other computer data storage device. Removable storage drive 1514 may read from and/or write to removable storage unit 1518.

Secondary memory 1510 may include other means, devices, components, instrumentalities or other approaches for allowing computer programs and/or other instructions and/or data to be accessed by computer system 1500. Such means, devices, components, instrumentalities or other approaches may include, for example, a removable storage unit 1522 and an interface 1520. Examples of removable storage unit 1522 and interface 1520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1500 may further include a communication or network interface 1524. Communication interface 1524 may enable computer system 1500 to communicate and interact with any combination of external devices, external networks, external entities, etc. (individually and collectively referenced by reference number 1528). For example, communication interface 1524 may allow computer system 1500 to communicate with external or remote devices 1528 over communications path 1526, which may be wired and/or wireless (or a combination thereof), and which may include any combination of LANs, WANs, the Internet, etc. Control logic and/or data may be transmitted to and from computer system 1500 via communication path 1526.

Computer system 1500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1500, main memory 1508, secondary memory 1510, and removable storage units 1518 and 1522, as well as tangible articles of manufacture embodying any combination of the foregoing. Such control logic, when executed by one or more data processing devices (such as computer system 1500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 15. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or variable, but every embodiment can not necessarily include the particular feature, structure, or variable. Moreover, such phrases are not necessarily referring to the same embodiment. Further, when a particular feature, structure, or variable is described in connection with an embodiment, it would be within the knowledge of persons skilled in the relevant art(s) to incorporate such feature, structure, or variable into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for evaluating a decision tree in a privacy preserving manner, comprising:
    receiving, by a first server, a first partial share of the decision tree and encrypted input data from a client, wherein the encrypted input data comprises a set of attributes;
    receiving, by a second server, a second partial share of the decision tree;
    by each of the first server and the second server: communicating with the other server to compute a classification result over the encrypted input data using the respective partial share of the decision tree received thereby and secure multi-party computation methods, including additive homomorphic encryption and oblivious transfer, such that the classification result is computed without decrypting the encrypted input data, and such that the classification result is ultimately received by the first server; and
    transmitting, by the first server, the classification result to the client.

2. The computer-implemented method of claim 1, wherein the decision tree comprises a full binary decision tree.

3. The computer-implemented method of claim 1, wherein the decision tree comprises a plurality of decision nodes and a plurality of leaf nodes,
    wherein the first partial share of the decision tree comprises a tuple of thresholds respectively associated with decision nodes of the decision tree and a tuple of attribute indices respectively associated with the decision nodes of the decision tree, and
    wherein the second partial share of the decision tree comprises a structural description of the decision tree and a tuple of classification labels respectively associated with the leaf nodes of the decision tree.

4. The computer-implemented method of claim 3, wherein the tuple of classification labels is encrypted with a first public key that is paired with a first private key that is accessible to the first server but not the second server, and
    wherein the tuple of thresholds is encrypted with a second public key that is paired with a second private key that is accessible to the second server but not the first server.

5. The computer-implemented method of claim 1, wherein the set of attributes is associated with a user, wherein the decision tree comprises a classification model trained on one or more previously-obtained sets of attributes associated with the user, and wherein the classification result indicates whether the user should or should not be authenticated.

6. The computer-implemented method of claim 5, wherein the set of attributes associated with the user comprise one or more of:
    behavioral attributes associated with the user; or
    biometric attributes associated with the user.

7. The computer-implemented method of claim 5, wherein the computer-implemented method is performed as a part of a continuous authentication process used to determine whether the user should have continued access to a system or resource.

8. The computer-implemented method of claim 1, wherein the first server and the second server communicate with each other directly or indirectly via one or more intermediaries.

9. A system for evaluating a decision tree in a privacy preserving manner, comprising:
    one or more memories; and
    at least one processor each coupled to at least one of the memories and configured to perform operations comprising:
        receiving a first partial share of the decision tree and encrypted input data from a client, wherein the encrypted input data comprises a set of attributes;
        communicating with a server that has received a second partial share of the decision tree to compute a classification result over the encrypted input data, wherein each of the system and the server is configured to compute the classification result over the encrypted input data using the respective partial share of the decision tree received thereby and secure multi-party computation methods, including additive homomorphic encryption and oblivious transfer, such that the classification result is computed without decrypting the encrypted input data, and such that the classification result is ultimately received by the system, and transmitting the classification result to the client.

10. The system of claim 9, wherein the decision tree comprises a full binary decision tree.

11. The system of claim 9, wherein the decision tree comprises a plurality of decision nodes and a plurality of leaf nodes, wherein the first partial share of the decision tree comprises a tuple of thresholds respectively associated with decision nodes of the decision tree and a tuple of attribute indices respectively associated with the decision nodes of the decision tree, and wherein the second partial share of the decision tree comprises a structural description of the decision tree and a tuple of classification labels respectively associated with the leaf nodes of the decision tree.

12. The system of claim 11, wherein the tuple of classification labels is encrypted with a first public key that is paired with a first private key that is accessible to the system but not the server, and wherein the tuple of thresholds is encrypted with a second public key that is paired with a second private key that is accessible to the server but not the system.

13. The system of claim 9, wherein the set of attributes is associated with a user, wherein the decision tree comprises a classification model trained on one or more previously-obtained sets of attributes associated with the user, and wherein the classification result indicates whether the user should or should not be authenticated.

14. The system of claim 13, wherein the set of attributes associated with the user comprise one or more of:

behavioral attributes associated with the user; or biometric attributes associated with the user.

15. The system of claim 9, wherein the system and the server are configured to communicate with each other directly or indirectly via one or more intermediaries.

16. A non-transitory computer-readable device having instructions stored thereon that, when executed by a first server, cause the first server to perform operations for evaluating a decision tree in a privacy preserving manner, the operations comprising:

receiving a first partial share of the decision tree and encrypted input data from a client, wherein the encrypted input data comprises a set of attributes;

communicating with a second server that has received a second partial share of the decision tree to compute a classification result over the encrypted input data, wherein the first server and the second server are each configured to compute the classification result over the encrypted input data using the respective partial share of the decision tree received thereby and secure multi-party computation methods, including additive homomorphic encryption and oblivious transfer, such that the classification result is determine without decrypting the encrypted input data, and such that the classification result is ultimately received by the first server; and transmitting the classification result to the client.

17. The non-transitory computer-readable device of claim 16, wherein the decision tree comprises a full binary decision tree.

18. The non-transitory computer-readable device of claim 16, wherein the decision tree comprises a plurality of decision nodes and a plurality of leaf nodes, wherein the first partial share of the decision tree comprises a tuple of thresholds respectively associated with decision nodes of the decision tree and a tuple of attribute indices respectively associated with the decision nodes of the decision tree, and wherein the second partial share of the decision tree comprises a structural description of the decision tree and a tuple of classification labels respectively associated with the leaf nodes of the decision tree.

19. The non-transitory computer-readable device of claim 18, wherein the tuple of classification labels is encrypted with a first public key that is paired with a first private key that is accessible to the first server but not the second server, and wherein the tuple of thresholds is encrypted with a second public key that is paired with a second private key that is accessible to the second server but not the first server.

20. The non-transitory computer-readable device of claim 16, wherein the set of attributes is associated with a user, wherein the decision tree comprises a classification model trained on one or more previously-obtained sets of attributes associated with the user, and wherein the classification result indicates whether the user should or should not be authenticated.

* * * * *